(12) United States Patent
Li et al.

(10) Patent No.: US 12,355,790 B2
(45) Date of Patent: Jul. 8, 2025

(54) DATA PACKET PROCESSING METHOD, APPARATUS, AND ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Hang Li, Shenzhen (CN); Liquan Nie, Shenzhen (CN); Fan Zeng, Shenzhen (CN); Keyun Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 207 days.

(21) Appl. No.: 17/991,770

(22) Filed: Nov. 21, 2022

(65) Prior Publication Data
US 2023/0092522 A1 Mar. 23, 2023

Related U.S. Application Data

(63) Continuation of application No. PCT/CN2021/120910, filed on Sep. 27, 2021.

(30) Foreign Application Priority Data

Oct. 22, 2020 (CN) .......................... 202011137281.7

(51) Int. Cl.
*H04L 9/40* (2022.01)

(52) U.S. Cl.
CPC ...... *H04L 63/1425* (2013.01); *H04L 63/0254* (2013.01); *H04L 63/1416* (2013.01); *H04L 63/20* (2013.01)

(58) Field of Classification Search
CPC ............. H04L 63/1425; H04L 63/0254; H04L 63/1416; H04L 63/20
See application file for complete search history.

(56) References Cited

U.S. PATENT DOCUMENTS 10,038,715 B1 * 7/2018 Majkowski ......... H04L 63/1458
10,516,695 B1 * 12/2019 Evans ................. H04L 63/1425
(Continued)

FOREIGN PATENT DOCUMENTS

CN 103095723 A 5/2013
CN 110958233 A 4/2020
(Continued)

OTHER PUBLICATIONS

C. Sheng et al. "Network Traffic Fingerprinting for IIoT Device Identification: A Survey." IEEE Transactions on Industrial Informatics, vol. 21, No. 5, p. 3541-3554. May 2025 (Year: 2025).*
(Continued)

*Primary Examiner* — Carl G Colin
*Assistant Examiner* — Zhe Liu
(74) *Attorney, Agent, or Firm* — Morgan, Lewis & Bockius LLP

(57) ABSTRACT

This application discloses a data packet processing method performed by an electronic device. The data packet processing method includes: obtaining a target network data packet; generating data packet fingerprints of the target network data packet, the data packet fingerprints including a target traffic attribute fingerprint and a target traffic payload fingerprint; determining a type of the target network data packet according to an occurrence frequency of the target traffic payload fingerprint in a fingerprint database and the target traffic attribute fingerprint, the fingerprint database including historical traffic payload fingerprints of a plurality of historical network data packets; and blocking a network connection of
(Continued)

the target network data packet when the type of the target network data packet is an abnormal type.

12 Claims, 11 Drawing Sheets

(56) References Cited

U.S. PATENT DOCUMENTS

| | | | |
|---|---|---|---|
| 10,924,503 B1* | 2/2021 | Pereira | H04L 63/20 |
| 2008/0134327 A1* | 6/2008 | Bharrat | H04L 63/1458 |
| | | | 726/22 |
| 2008/0307524 A1* | 12/2008 | Singh | H04L 63/1416 |
| | | | 726/22 |
| 2015/0200956 A1* | 7/2015 | Koide | H04L 63/1408 |
| | | | 726/22 |
| 2016/0352765 A1 | 12/2016 | Mermoud et al. | |
| 2018/0063178 A1* | 3/2018 | Jadhav | H04L 63/1433 |
| 2018/0081752 A1 | 3/2018 | Fisher et al. | |
| 2018/0198809 A1* | 7/2018 | Kushwaha | G06F 21/564 |
| 2018/0295134 A1* | 10/2018 | Gupta | H04L 67/56 |
| 2020/0014711 A1* | 1/2020 | Rego | H04L 63/1433 |
| 2020/0162507 A1* | 5/2020 | Dudouit | H04L 63/108 |
| 2021/0185061 A1* | 6/2021 | Sedjelmaci | H04L 63/1433 |
| 2021/0377161 A1* | 12/2021 | Li | H04L 45/30 |
| 2021/0400069 A1* | 12/2021 | Mitani | H04L 43/0876 |
| 2022/0230070 A1* | 7/2022 | Shabtai | G06F 18/217 |
| 2022/0368706 A1* | 11/2022 | Tang | H04L 67/02 |

FOREIGN PATENT DOCUMENTS

| | | |
|---|---|---|
| CN | 111177267 A | 5/2020 |
| CN | 111586005 A | 8/2020 |
| CN | 112019574 A | 12/2020 |
| CN | 112019575 A | 12/2020 |
| WO | WO 2020075518 A1 | 4/2020 |

OTHER PUBLICATIONS

Tencent Technology, ISR, PCT/CN2021/120910, Dec. 31, 2021, 2 pgs.

Tencent Technology, WO, PCT/CN2021/120910, Dec. 31, 2021, 4 pgs.

Tencent Technology, IPRP, PCT/CN2021/120910, Apr. 13, 2023, 5 pgs.

* cited by examiner

DATA PACKET PROCESSING METHOD, APPARATUS, AND ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Patent Application No. PCT/CN2021/120910, entitled "ME MOD AND DEVICE FOR DATA PACK PROCESSING, ELECTRONIC DEVICE, COMPUTER-READABLE STORAGE MEDIUM, AND COMPUTER PROGRAM PRODUCT" filed on Sep. 27, 2021, which claims priority to Chinese Patent Application No. 202011137281.7, filed with the State Intellectual Property Office of the People's Republic of China on Oct. 22, 2020, and entitled "DATA PACKET PROCESSING METHOD AND DEVICE, COMPUTER EQUIPMENT AND STORAGE MEDIUM", all of which are incorporated herein by reference in their entirety.

FIELD OF THE TECHNOLOGY

This application relates to the field of computer technologies, and in particular, to a data packet processing method, apparatus, and electronic device, a computer-readable storage medium, and a computer program product.

BACKGROUND OF THE DISCLOSURE

With the continuous development of computer technologies, computer networks have become an important feature of the information age. However, with the frequent occurrence of information security incidents such as network attacks and password theft, security of a system and protection of the system from external interference, attacks, and invasion become especially important.

Data transmission in a network is performed in the form of data packets. The current detection method for the security of a data packet is to obtain an Internet protocol address (IP address) from which the data packet is sent. If the IP address from which the data packet is sent is on a blacklist, it may be determined that the data packet is a data packet with a security threat. Once a data packet with a security threat is detected, the data packet may be discarded, or a connection of the data packet may be disconnected.

As can be seen, the existing data packet detection method is based on an IP address. Once an attacker continuously changes an IP address thereof when launching a network attack, the data packet detection method based on an IP address fails, resulting in low accuracy of the data packet security detection.

SUMMARY

The embodiments of this application provide a data packet processing method, apparatus, and electronic device, a computer-readable storage medium, and a computer program product, which can improve the accuracy of data packet type identification, and can further improve the accuracy of data packet security detection.

An embodiment of this application provides a data packet processing method performed by an electronic device, the method including:

obtaining a target network data packet;

generating data packet fingerprints of the target network data packet, the data packet fingerprints including a target traffic attribute fingerprint and a target traffic payload fingerprint;

determining a type of the target network data packet according to an occurrence frequency of the target traffic payload fingerprint in a fingerprint database and the target traffic attribute fingerprint, the fingerprint database including historical traffic payload fingerprints of a plurality of historical network data packets; and blocking a network connection of the target network data packet when the type of the target network data packet is an abnormal type.

An embodiment of this application provides a data packet processing apparatus, including:

a first obtaining module, configured to obtain a target network data packet;

a generation module, configured to generate data packet fingerprints of the target network data packet, the data packet fingerprints including a target traffic attribute fingerprint and a target traffic payload fingerprint;

a determining module, configured to determine a type of the target network data packet according to an occurrence frequency of the target traffic payload fingerprint in a fingerprint database and the target traffic attribute fingerprint, the fingerprint database including historical traffic payload fingerprints of a plurality of historical network data packets; and a blocking module, configured to block a network connection of the target network data packet when the type of the target network data packet is an abnormal type.

An embodiment of this application provides an electronic device for data packet processing, including a memory and a processor, the memory storing a computer program, the computer program, when executed by the processor, causing the electronic device to perform the data packet processing method in the embodiments of this application.

An embodiment of this application provides a non-transitory computer-readable storage medium, storing a computer program, the computer program, when executed by a processor of an electronic device, causing the electronic device to perform the data packet processing method in the embodiments of this application.

An embodiment of this application provides a computer program product, including computer instructions, the computer instructions, when executed by a processor of an electronic device for data packet processing, performing the data packet processing method in the embodiments of this application.

In the embodiments of this application, whether the network data packet is an abnormal data packet is determined by detecting the data packet fingerprints of the network data packet. Since the data packet fingerprints can express the behavior of the data packet, it is essentially determined whether the data packet is an abnormal data packet from the behavior. Compared with the manner of determining whether the data packet is an abnormal data packet according to an IP address from which the data packet is sent, the abnormal data packet can be more accurately identified and the network security is improved. Moreover, even if an attacker constantly changes an IP address thereof, as long as content of a data packet is detected to have a security threat, the network connection is interrupted, thereby achieving precise prevention and control, and real-time blocking, and improving the accuracy of data packet security detection.

BRIEF DESCRIPTION OF THE DRAWINGS

To describe the technical solutions in the embodiments of this application or in the related art more clearly, the following briefly describes the accompanying drawings required for describing the embodiments or the related art. Apparently, the accompanying drawings in the following description show only some embodiments of this application, and a person of ordinary skill in the art may derive other drawings from the accompanying drawings without creative efforts.

DESCRIPTION OF EMBODIMENTS

Figure 1:
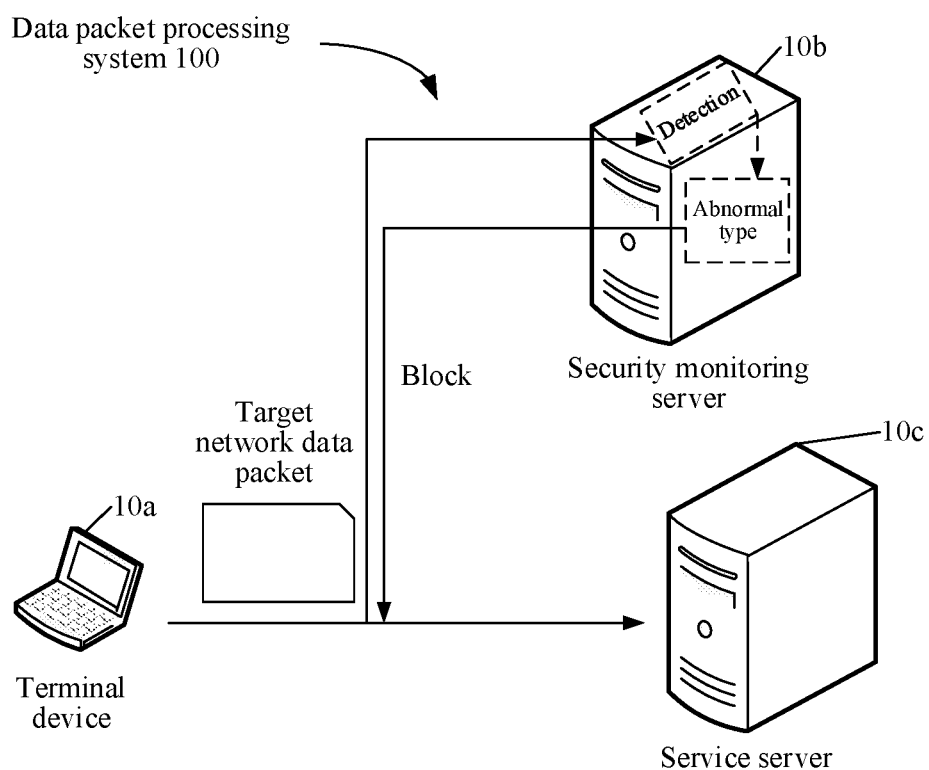
FIG. 1 is a system architecture diagram of data packet processing according to an embodiment of this application.

The technical solutions in the embodiments of this application are clearly and completely described below with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

At present, cloud technologies are mainly divided into cloud basic technologies and cloud application. The cloud basic technologies may be further subdivided into: cloud computing, cloud storage, database, and big data. The cloud application may be further subdivided into: medical cloud, Cloud IoT, cloud security, cloud calling, private cloud, public cloud, hybrid cloud, cloud gaming, cloud education, cloud conference, cloud social networking, artificial intelligence cloud services, and the like.

A data packet processing method provided in the embodiments of this application may involve cloud computing and cloud storage subordinate to the cloud technologies, which are described separately below.

Cloud computing is a computing model that distributes computing tasks on a resource pool composed of a large number of computers, enabling various application systems to obtain computing power, storage space and information services as needed. A network that provides resources is referred to as a "cloud". For a user, resources in a "cloud" seem to be infinitely expandable, and can be obtained readily, used on demand, expanded readily, and paid according to use.

In the embodiments of this application, a server may obtain sufficient computing power and storage space through the cloud computing technology, and then perform the generation of data packet fingerprints and the determination of a type of a target network data packet involved in the embodiments of this application.

Cloud storage is a new concept extended and developed from the concept of cloud computing. Distributed cloud storage system (or referred to as storage system) refers to a storage system that integrates a large number of different types of storage devices (or referred to as storage nodes) in the network through application software or application interfaces to work together to provide data storage and service access functions through functions such as cluster application, grid technologies, and a distributed storage file system.

In this embodiment of this application, a traffic payload key string library and a fingerprint database may be stored on the "cloud" by the server through the cloud storage technology. When data needs to be queried in the traffic payload key string library or the fingerprint database, the traffic payload key string library or the fingerprint database may be pulled from the cloud storage device at any time to reduce the local storage pressure of the server.

The embodiments of this application may be applied to resisting any network attack initiated in the form of dialing IP in seconds. Generally, a network attack initiated in the form of dialing IP in seconds is that an attacker uses a large number of different IP addresses to send similar network data packets to a service server to exhaust connection resources of the service server, causing the service server to go down or even crash; or spies on asset data in the service server; or blasts a password in the service server, or the like. In the embodiments of this application, whether content of each network data packet violates the rules is identified, and once the content of the network data packet is determined to trigger the rules, accurate blocking is implemented to prevent the connection resources of the service server from being maliciously consumed, or prevent data packets from spying on the asset data in the service server, or prevent data packets from blasting the password in the service server, or the like.

FIG. 1 is a system architecture diagram of data packet processing according to an embodiment of this application. A data packet processing system 100 provided in this embodiment of this application involves a terminal device 10a, a security monitoring server 10b, and a service server 10c. When the terminal device 10a sends a target network data packet to the service server 10c, the security monitoring server 10b bypasses the target network data packet, and the security monitoring server 10b generates a target traffic attribute fingerprint and a target traffic payload fingerprint of the target network data packet. A type of the target network data packet is determined according to an occurrence frequency of the target traffic payload fingerprint in the fingerprint database and the target traffic attribute fingerprint. When the security monitoring server 10b detects that the type of the target network data packet is an abnormal type, a network connection of the target network data packet is blocked, that is, the network connection between the terminal device 10a and the service server 10c is blocked.

The security monitoring server 10b, and the service server 10c shown in FIG. 1 may be independent physical servers, or may be a server cluster or a distributed system formed by a plurality of physical servers, or may be cloud servers that provide basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal device 10a shown in FIG. 1 may be a smart device with a data packet processing function, such as a mobile phone, a tablet computer, a notebook computer, a handheld computer, a mobile Internet device (MID), a wearable device, a smart home appliance, and an in-vehicle device. The terminal device 10a and the service server 10c may be directly or indirectly connected to the security monitoring server 10b in a wired or wireless communication manner. This is not limited in this embodiment of this application.

The terminal device 10a in FIG. 1 may be provided with a client, and the target network data packet may be sent by running the installed client. The client may be a native application (APP), that is, an application that needs to be installed in the operating system to run, such as a website client, a livestreaming APP, or an instant messaging APP; or may be an applet, that is, a program that can run only after being downloaded into the browser environment; or may be an applet that can be embedded in any APP. In summary, the foregoing computer program may be an application, a module, or a plug-in in any form.

A description is made below in detail by taking an example in which how the security monitoring server 10b identifies a type of a target network data packet.

Figure 2A:
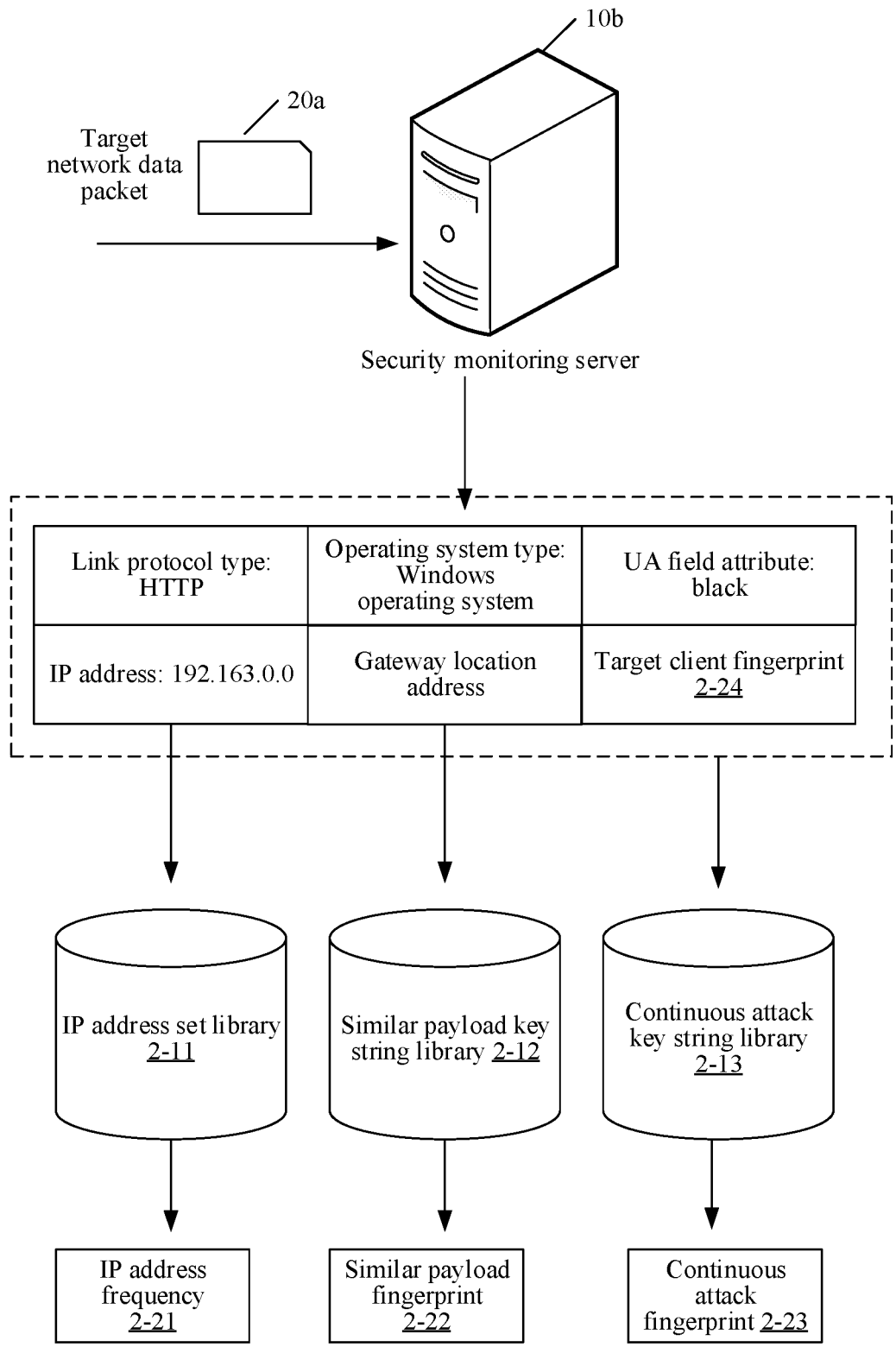
FIG. 2A to FIG. 2D are schematic diagrams of scenarios of data packet processing according to an embodiment of this application.

FIG. 2A to FIG. 2D are schematic diagrams of scenarios of data packet processing according to an embodiment of this application. As shown in FIG. 2A, when accessing a website, sending an instant message, or watching a video through a client, the client sends a target network data packet 20a to the service server, and the security monitoring server 10b bypasses the target network data packet 20a, obtains a link protocol type of the target network data packet from the target network data packet 20a, obtains an operating system type of the client sending the target network data packet, obtains a user agent (UA) field attribute, obtains an IP address of the target network data packet 20a, obtains a gateway location address (or referred to as a common gateway interface (CGI) address), and obtains a target client fingerprint 2-24. For example, the obtained link protocol type of the target network data packet is a hypertext transfer protocol (HTTP), the operating system type is a "Windows" operating system, the user agent field attribute is black, and the IP address is 192.163.0.0.

The security monitoring server 10b may then determine an attribute (the attribute may be white, gray, and black) corresponding to the UA field in the target network data packet 20a according to a preset rule. The security monitoring server 10b may further call a fingerprint identification function to identify the target client fingerprint 2-24 corresponding to the client sending the target network data packet 20a.

In this way, the security monitoring server 10b obtains the link protocol type, the operating system type, the UA field attribute, the IP address, gateway location address, and the target client fingerprint 2-24 of the target network data packet 20a. The operating system type and the UA field attribute are the client content.

When the IP address may be divided into an A segment, a B segment, a C segment, and a D segment (for example, 192 is the A segment, 163 is the B segment, 0 is the C segment, and 0 is the D segment), the security monitoring server 10b counts an occurrence frequency of the B segment of the IP address of the target network data packet 20a in B segments of a plurality of IP addresses in an IP address set library 2-11, counts an occurrence frequency of the C segment of the IP address of the target network data packet 20a in C segments of a plurality of IP addresses in the IP address set library 2-11, and adds the two occurrence frequencies to obtain an IP address frequency 2-21 (referred to as an address occurrence frequency).

The security monitoring server 10b performs word segmentation processing on the gateway location address to obtain a first segmented word set, matches the first segmented word set with a similar payload key string library 2-12, determines a similar payload key string existing in the first segmented word set from the similar payload key string library 2-12, and determines a message digest algorithm value (MD5 value) of the determined similar payload key string as a similar payload fingerprint 2-22 of the target network data packet 20a.

The target network data packet 20a may be regarded as a string. The security monitoring server 10b performs word segmentation processing on the target network data packet 20a to obtain a second segmented word set, matches the second segmented word set with a continuous attack key string library 2-13, determines a continuous attack key string existing in the second segmented word set from the continuous attack key string library 2-13, and determines an MD5 value of the determined continuous attack key string as a continuous attack fingerprint 2-23 of the target network data packet 20a.

The IP address set library 2-21, the similar payload key string library 2-22, and the continuous attack key string library 2-23 are preset.

Figure 2B:
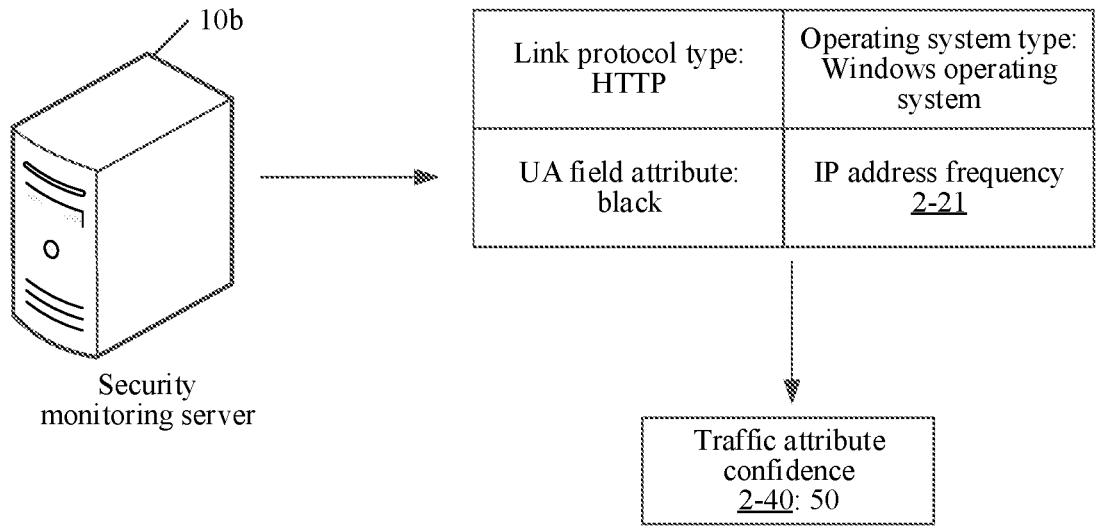

As shown in FIG. 2B, the security monitoring server 10b respectively determines a corresponding confidence according to preset scoring rules, and the foregoing determined link protocol type, operating system type, UA field attribute, and IP address frequency 2-21 of the target network data packet 20a, to obtain four confidences. The four confidences are added to obtain a traffic attribute confidence 2-40 of the target network data packet 20a. For example, the traffic attribute confidence 2-40 of the target network data packet 20a is 50.

Figure 2C:
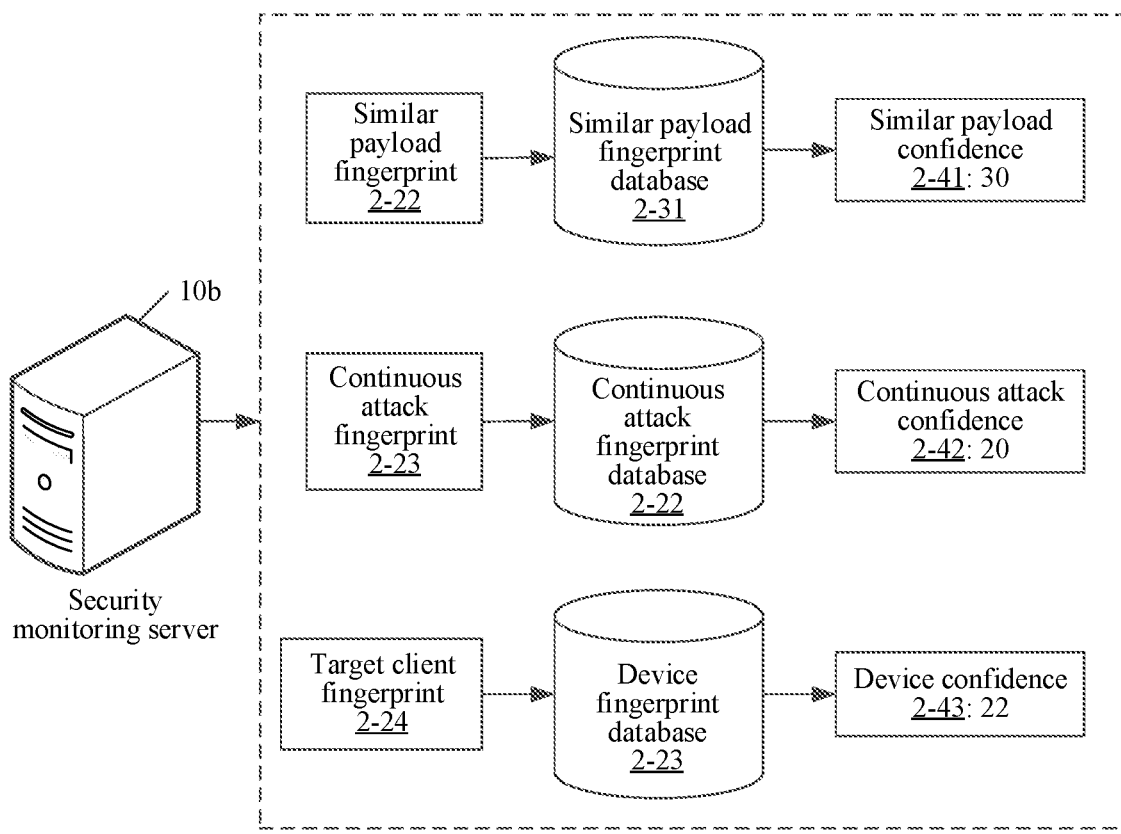

As shown in FIG. 2C, the security monitoring server 10*b* queries an occurrence frequency of the similar payload fingerprint 2-22 of the target network data packet 20*a* in a similar payload fingerprint database 2-31, and determines a similar payload confidence 2-41 according to the occurrence frequency. For example, the determined similar payload confidence 2-41 is 30. Certainly, a higher occurrence frequency of the similar payload fingerprint 2-21 of the target network data packet 20*a* in the similar payload fingerprint database 2-31 indicates a higher corresponding similar payload confidence 2-41.

As shown in FIG. 2C, the security monitoring server 10*b* queries an occurrence frequency of the continuous attack fingerprint 2-23 of the target network data packet 20*a* in a continuous attack fingerprint database 2-32, and determines a continuous attack confidence 2-42 according to the occurrence frequency. For example, the determined continuous attack confidence 2-42 is 20. Certainly, a higher occurrence frequency of the continuous attack fingerprint 2-23 of the target network data packet 20*a* in the continuous attack fingerprint database 2-32 indicates a higher corresponding continuous attack confidence 2-42.

As shown in FIG. 2C, the security monitoring server 10*b* queries an occurrence frequency of the target client fingerprint 2-24 of the target network data packet 20*a* in a device fingerprint database 2-33, and determines a device confidence 2-43 according to the occurrence frequency. For example, the determined device confidence 2-43 is 22. Certainly, a higher occurrence frequency of the client fingerprint 2-24 of the target network data packet 20*a* in the device fingerprint database 2-33 indicates a higher corresponding device confidence 2-43.

The similar payload fingerprint database 2-31 includes similar payload fingerprints of a plurality of historical network data packets, the continuous attack fingerprint database 2-32 includes continuous attack fingerprints of a plurality of historical network data packets, and the device fingerprint database 2-33 includes client fingerprints of a plurality of historical network data packets.

In this embodiment of this application, determining the similar payload confidence 2-41, the continuous attack confidence 2-42, and the device confidence 2-43 of the target network data packet 20*a* is to determine whether there is a historical network data packet similar to the target network data packet 20*a* in a plurality of historical network data packets and an occurrence frequency thereof. In addition, a higher occurrence frequency indicates a greater security threat of the target network data packet 20*a*. This is because when an attacker launches an attack, a large number of similar forged data packets are generally launched to consume transmission control protocol (TCP) connection resources of the service server. Therefore, if a large number of similar target network data packets are received in a specific time period, the target network data packets are likely to be malicious data packets.

Figure 2D:
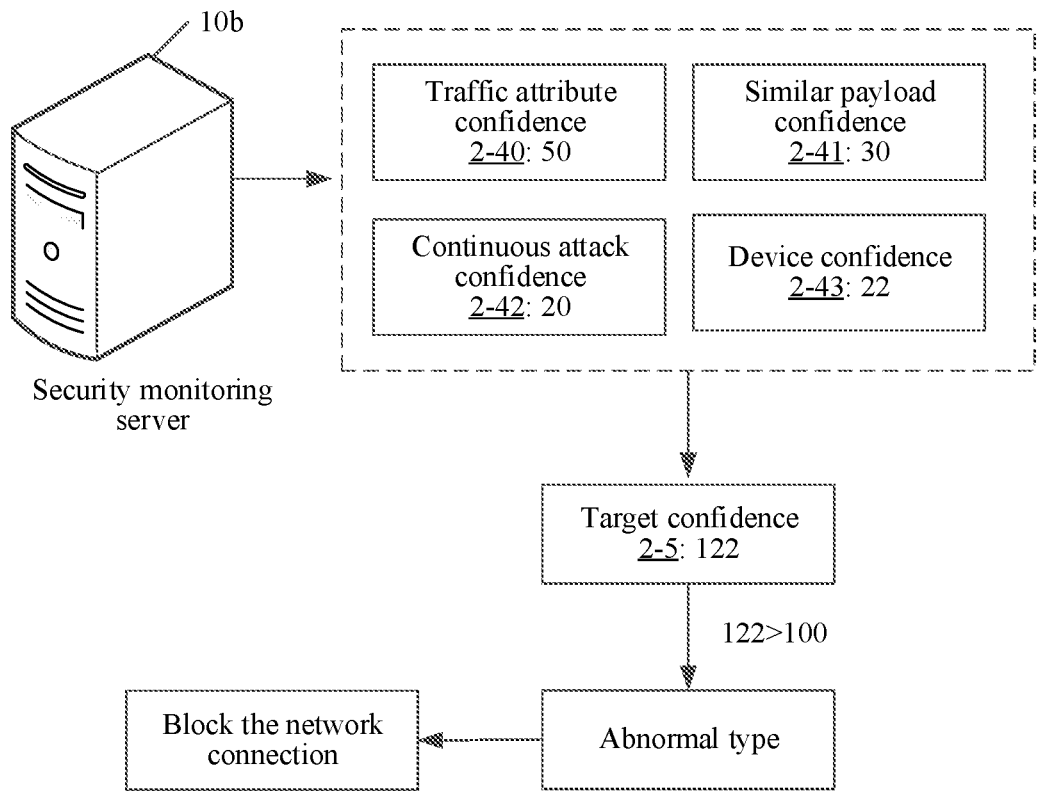

As shown in FIG. 2D, the security monitoring server 10*b* adds the traffic attribute confidence 2-40 (50), the continuous attack confidence 2-42 (20), the similar payload confidence 2-41 (30), and the device confidence 2-43 (22) determined above, to obtain a target confidence 2-5 (122) of the target network data packet 20*a*. A preset confidence threshold (referred to as a first confidence threshold) is obtained. When the first confidence threshold is equal to 100, since 122>100, it may be determined that the type of the target network data packet 20*a* is an abnormal type.

After determining the type of the target network data packet 20*a*, the security monitoring server 10*b* may block the network connection of the target network data packet 20*a*, that is, block the TCP network connection established between the client and the service server based on the target network data packet 20*a*. In this way, the identification of the type of the target network data packet is completed.

It may be understood that, compared to determining the type of the target network data packet according to the IP address, the type identification is performed based on the data packet content of the target network data packet. The data packet processing method provided in the embodiments of this application can ensure the accuracy of identification. Even if the attacker constantly changes the IP address, as long as the content of the target network data packet is detected to have a security threat, the network connection is interrupted, to avoid the case that the blacklisted IP protection solution may fail or mistaken blocking. Therefore, the data packet processing method provided in the embodiments of this application can achieve precise prevention and control and real-time blocking.

For the specific process of obtaining the target network data packet (for example, the target network data packet 20*a* in this embodiment of this application), generating the data packet fingerprints of the target network data packet (for example, the link protocol type, the operating system type, the UA field, the IP address frequency, the similar payload fingerprint, the continuous attack fingerprint, and the device fingerprint in this embodiment of this application), and determining the type of the target network data packet (for example, the type of the target network data packet 20*a* in this embodiment of this application is an abnormal type), reference may be made to the descriptions of this embodiment of this application corresponding to FIG. 3 to FIG. 10 below.

Figure 3:
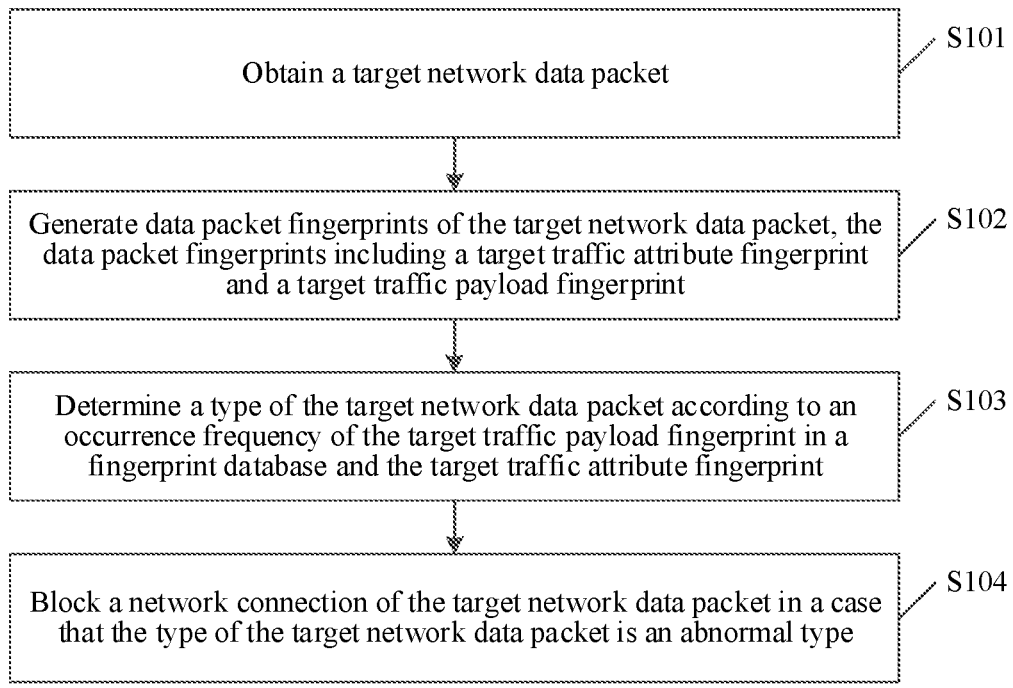
FIG. 3 is a schematic flowchart 1 of a data packet processing method according to an embodiment of this application.

FIG. 3 is a schematic flowchart 1 of a data packet processing method according to an embodiment of this application. As shown in FIG. 3, the process of identifying the type of the target network data packet in this embodiment of this application is described. An exemplary application in which the electronic device for data packet processing is implemented as a server (for example, the security monitoring server 10*b* in the embodiment corresponding to FIG. 2A to FIG. 2D) is described. The data packet processing method includes S101 to S104, and each step is described below.

S101: Obtain a target network data packet.

In this embodiment of this application, the server obtains the target network data packet to be identified (referred to as the target network data packet, such as the target network data packet 20*a* in the embodiment corresponding to FIG. 2A to FIG. 2D). The target network data packet is also referred to as a request (or flow data), and the target network data packet may be obtained by the server through bypass diversion. The bypass diversion means that the target network data packet is originally sent from the client to the service server, and when the target network data packet passes through a switch, the server obtains a copy of the target network data packet from the switch to detect the type of the target network data packet. In this case, it may be considered that there is a parallel relationship between the service server and the server. Certainly, during the detection process of the target network data packet, the target network data packet is still sent by the switch to the service server. The advantage of bypass diversion is to reduce the time required for the service server to receive the target network data packet, and no architectural burden is increased for the client, the switch, or the service server. The server for detecting the type of the target network data packet may be withdrawn or installed at any time.

Alternatively, the server is connected in series between the switch and the service server. In this case, only if the server passes the detection of the target network data packet, the server can forward the target network data packet to the service server. The advantage of the connection in series is that there is no lag in detection results. Any attack on the service server has no impact on the service server. This is because when the server identifies a target network data packet of an abnormal type, the target network data packet is directly discarded, and the service server does not receive the target network data packet of the abnormal type at all.

S102: Generate data packet fingerprints of the target network data packet, the data packet fingerprints including a target traffic attribute fingerprint and a target traffic payload fingerprint.

In this embodiment of this application, the server generates the traffic attribute fingerprint (referred to as the target traffic attribute fingerprint) of the target network data packet and the traffic payload fingerprint (referred to as the target traffic payload fingerprint) of the target network data packet, and combines the determined target traffic attribute fingerprint and target traffic payload fingerprint into the data packet fingerprints of the target network data packet.

The "fingerprint" in the embodiments of this application is a string of ciphertext (or string) that can identify an attribute corresponding to the target network data packet, and is unique and does not conflict with other fingerprints. That is, the target traffic attribute fingerprint is a string of ciphertext that can represent a traffic attribute of the target network data packet, and the target traffic payload fingerprint is a string of ciphertext that can represent a traffic payload of the target network data packet.

The process of extracting the target traffic attribute fingerprint of the target network data packet is described first below.

Since the link protocol type is included in the target network data packet, the server can directly obtain the link protocol type of the target network data packet. The server extracts the client content of the client sending the target network data from the target network data packet. The client content may include: the operating system type of the client and the UA field.

The server obtains the protocol address from which the target network data packet is sent. The protocol address may be divided into a plurality of protocol segment addresses, and the plurality of protocol segment addresses are a B segment protocol address and a C segment protocol address respectively. The server respectively obtains an occurrence frequency of the B segment protocol address of the target network data packet in a protocol segment address set, and an occurrence frequency (which is referred to as an address occurrence frequency similar to the occurrence frequency of the B segment protocol address in the protocol segment address set) of the C segment protocol address in the protocol segment address set. The protocol segment address set includes a B segment protocol address set and a C segment protocol address set. The address occurrence frequencies refer to the occurrence frequency of the B segment protocol address of the target network data packet in the B segment protocol address set and the occurrence frequency of the C segment protocol address of the target network data packet in the C segment protocol address set.

The server uses the link protocol type, the client content, and the two address occurrence frequencies obtained above as the target traffic attribute fingerprint of the target network data packet.

The process of extracting the target traffic payload fingerprint of the target network data packet is described below.

The server extracts a gateway location address (referred to as a target gateway location address) from the target network data packet, where the target network data packet includes a request address uniform resource locator (URL), and the request address URL is formed by a host Name (HOST)+ CGI. The CGI is the target gateway location address in this embodiment of this application. For example, URL: http://www.test.com/cgi-bin/hello.py/key1=value1&key2=value2. The gateway location address (CGI) is: /cgi-bin/hello.py/key1=value1&key2=value2, and HOST is: http://www.test.com. The server performs word segmentation processing on the target gateway location address to obtain a plurality of phrases (referred to as a similar payload phrase set). Similar payload key strings belonging to similar payload phrase set are searched from a similar payload key string library (for example, the similar payload key string library 2-12 in the embodiment corresponding to FIG. 2A).

The server may consider the entire target network data packet as a string, and perform word segmentation processing on the string to obtain a plurality of phrases (referred to as a continuous attack phrase set). The server searches for continuous attack key strings belonging to the continuous attack phrase set from a continuous attack key string library (for example, the continuous attack key string library in the embodiment corresponding to FIG. 2A to FIG. 2D).

The server combines the searched similar payload key strings and the searched continuous attack key strings into a payload key string. The similar payload key string library and the continuous attack key string library belong to the traffic payload key string library.

The similar payload key string library is generated after frequent sequence pattern extraction of gateway location addresses in a plurality of historical network data packets. The continuous attack key string library is generated after frequent sequence pattern extraction of a plurality of historical network data packets belonging to a plurality of attack stages.

The server calls the fingerprint identification function to determine the client fingerprint of the client sending the target network data packet (referred to as the target client fingerprint). The target client fingerprint is used as a network fingerprint and used for identifying the underlying client and server applications, avoiding determination of underlying implementation according to an apparent identifying factor such as a "Client" or "Server" string. The fingerprint identification function may be a function application on the client or a function application on the server, which is not limited in this embodiment of this application. The fingerprint identification function may be realized based on "JA3", "HASSH", and "FATT".

Taking "JA3" as an example, the processing of the fingerprint identification function is: collecting decimal byte values of the following fields in the target network data packet: version, acceptable cipher, extended list, elliptic curve cipher, and elliptic curve cipher format. The values of the version, the acceptable cipher, the extended list, the elliptic curve cipher, and the elliptic curve cipher format are then concatenated to obtain a string, where "," is used to separate the fields, and "-" is used to separate the values in the fields. An MD5 value of the string obtained by concatenation is calculated, and the MD5 value is used as the target client fingerprint of the target network data packet.

The server may use "-" to connect the similar payload key string in the foregoing payload key string, calculate an MD5 value of the connected string, and use the MD5 value as a data fingerprint of the similar payload key string. Similarly, the server may use "-" to connect the continuous attack key string in the foregoing payload key string, calculate an MD5 value of the connected string, and use the MD5 value as a data fingerprint of the continuous attack key string.

The server may combine the data fingerprint of the similar payload key string, the data fingerprint of the continuous attack key string, and the target client fingerprint into the traffic payload fingerprint (referred to as the target traffic payload fingerprint) of the target network data packet.

In this way, the server determines the target traffic input attribute fingerprint and the target traffic payload fingerprint of the target network data packet.

Figure 4:
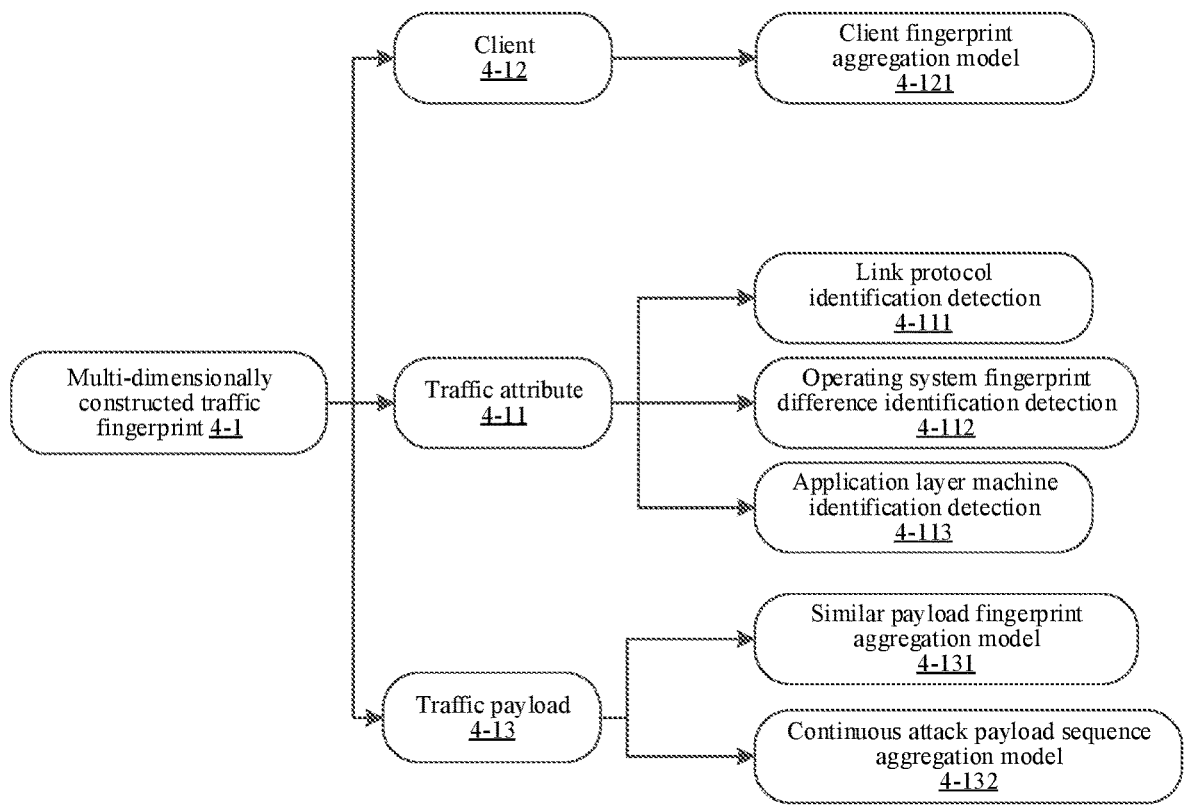
FIG. 4 is a schematic diagram of constructing a traffic fingerprint from a plurality of dimensions according to an embodiment of this application.

FIG. 4 is a schematic diagram of constructing a traffic fingerprint from a plurality of dimensions according to an embodiment of this application. As shown in FIG. 4, this embodiment of this application analyzes the process in which an attacker initiates a request. First, the attacker needs to select a client, such as a personal computer (PC) or a mobile terminal. The attacker then needs to construct traffic properties, such as a link protocol type and an operating system type. Finally, the attacker needs to construct a payload of the traffic. Therefore, in this embodiment of this application, the server constructs traffic fingerprints from a plurality of dimensions of the client, the link protocol type, and the traffic payload. Therefore, as shown in FIG. 4, multi-dimensionally constructed traffic fingerprints 4-1 include a traffic fingerprint on a client 4-12, a traffic fingerprint on a traffic attribute 4-11, and a traffic fingerprint on a traffic payload 4-13. The traffic attribute 4-11 in FIG. 4 may correspond to the target traffic attribute fingerprint in this embodiment of this application, and the target traffic attribute fingerprint may include the link protocol type, the operating system type, and the UA field (the operating system type and the UA field may be further combined into client content). The link protocol type may be obtained based on link protocol identification detection 4-111, and the operating system type may be obtained based on operating system fingerprint difference identification detection 4-112. A field attribute confidence may be determined based on the UA field subsequently, where the field attribute confidence is obtained based on application layer machine identification detection 4-113. The client 4-12 in FIG. 4 may correspond to the target client fingerprint in this embodiment of this application, and a similar payload fingerprint and a continuous attack payload sequence in the traffic payload 4-13 may correspond to the target traffic payload fingerprint in this embodiment of this application. The similar payload fingerprint may correspond to the data fingerprint of the similar payload key string in this embodiment of this application, and the continuous attack payload sequence may correspond to the data fingerprint of the continuous attack key string in this embodiment of this application. A client fingerprint aggregation model 4-121 in FIG. 4 may be used to construct a device fingerprint library and identify a client fingerprint of any client. A similar payload fingerprint aggregation model 4-131 may be used to construct a similar payload key string library and a similar payload fingerprint database. A continuous attack payload sequence aggregation model 4-132 may be used to construct a continuous attack key string library and a continuous attack fingerprint database.

S103: Determine a type of the target network data packet according to an occurrence frequency of the target traffic payload fingerprint in a fingerprint database and the target traffic attribute fingerprint, the fingerprint database including historical traffic payload fingerprints of a plurality of historical network data packets.

In this embodiment of this application, the target traffic payload fingerprints include the data fingerprint of the similar payload key string, the target client fingerprint, and the data fingerprint of the continuous attack key string. The server counts the occurrence frequency (referred to as a similar payload fingerprint occurrence frequency) of the data fingerprint (the data fingerprint of the similar payload key string may also be referred to as a similar payload fingerprint of the target network data packet) of the similar payload key string in the similar payload fingerprint database, and determines the similar payload confidence according to the similar payload fingerprint occurrence frequency. Certainly, a higher similar payload fingerprint occurrence frequency indicates a higher similar payload confidence. The similar payload fingerprint database includes similar payload fingerprints of a plurality of historical network data packets. The server determines the occurrence frequency of the similar payload fingerprint included in the target network data packet in the similar payload fingerprint database based on the similar payload fingerprints of the plurality of historical network data packets.

The server counts an occurrence frequency (referred to as a device fingerprint occurrence frequency) of the target client fingerprint in the device fingerprint database, and determines a device confidence according to the device fingerprint occurrence frequency. Certainly, a higher device fingerprint occurrence frequency indicates a higher device confidence. The device fingerprint database includes client fingerprints of a plurality of historical network data packets. The server determines the occurrence frequency of the target client fingerprint in the device fingerprint database based on the client fingerprints of the plurality of historical network data packets.

The server counts the occurrence frequency (referred to as a continuous attack fingerprint occurrence frequency) of the data fingerprint (the data fingerprint of the continuous attack key string may also be referred to as a continuous attack fingerprint of the target network data packet) of the continuous attack key string in the continuous attack fingerprint database, and determines the continuous attack confidence according to the continuous attack fingerprint occurrence frequency. Certainly, a higher continuous attack fingerprint occurrence frequency indicates a higher continuous attack confidence. The continuous attack fingerprint database includes continuous attack fingerprints of a plurality of historical network data packets belonging to a plurality of attack stages.

In this embodiment of this application, when determining the continuous attack confidence, the server needs to refer to the continuous attack fingerprint occurrence frequency, determines which attack stage the continuous attack fingerprint of the target network data packet belongs to, and determines the continuous attack confidence according to the determined attack stage and the continuous attack fingerprint occurrence frequency. The plurality of attack stages include three attack stages, namely: a stage of collecting target information at spots, a stage of establishing a stronghold, and a stage of lateral movement.

The server adds the similar payload confidence, the device confidence, and the continuous attack confidence to obtain the traffic payload confidence.

The target traffic attribute fingerprint includes the link protocol type, the client content, and the address occurrence frequencies. The server respectively determines a confidence (referred to as a protocol confidence) corresponding to the link protocol type of the target network data packet, a confidence (referred to as a client content confidence) corresponding to the client content, and a confidence (referred to as an address frequency confidence) corresponding to the address occurrence frequencies. The server determines the foregoing confidences based on preset rules. The server may add the foregoing protocol confidence, client content confidence, and address frequency confidence to obtain the traffic attribute confidence (for example, the traffic attribute confidence 2-40: 50 in the embodiment corresponding to FIG. 2A to FIG. 2D).

The following first describes the process of determining the link protocol and determine the corresponding protocol confidence.

The server determines a score corresponding to the link protocol type based on a preset rule, and uses the score as the protocol confidence corresponding to the link protocol type. For example, the preset rule is that: a score corresponding to the HTTP link protocol type is 10, a score corresponding to the file transfer protocol (FTP) link protocol type is 20, and a score corresponding to a simple mail transfer protocol (SMTP) link protocol type is 30. When the link protocol type of the target network data packet is HTTP, the protocol confidence of the target network data packet may be 10.

The process of determining the corresponding client content confidence according to the client content is described below.

In this embodiment of this application, the client content may include the operating system type and the UA field of the client. The server determines a score corresponding to the operating system type based on a preset rule, and uses the score as the operating system confidence corresponding to the operating system type. For example, the preset rule is that: a score corresponding to a "Windows" operating system type is 10, a score corresponding to a "Linux" operating system type is 20, and a score corresponding to a "Unix" operating system type is 30. When the operating system type of the client sending the target network data packet is the "Windows" operating system type, the operating system confidence corresponding to the target network data packet may be 10.

The server detects whether the UA field in the client content is empty. If the UA field is empty, an attribute of the UA field may be marked as black; and if the UA field is not empty, it is detected whether the UA field is generated by a common automation tool. If the UA field is generated by a common automation tool, attribute of the UA field may be marked as black; otherwise, a header field sequence of the UA field is extracted. If the header field sequence is a common browser request header, the attribute of the UA field is marked as white. If the header field sequence is an automation tool request header, the attribute of the UA field is marked as gray. If the header field sequence is neither a common browser request header nor an automation tool request header, the attribute of the UA field is marked as black. The server determines the field attribute confidence according to the attribute of the UA field, where the field attribute confidence of the UA field marked as black>the field attribute confidence of the UA field marked as gray>the field attribute confidence of the UA field marked as white.

The server adds the operating system confidence and the field attribute confidence determined above to obtain the client content confidence.

The following describes the process of determining the corresponding address frequency confidence according to the address occurrence frequency.

In this embodiment of this application, there are two address occurrence frequencies, which are an address occurrence frequency of the B segment protocol address of the target network data packet in the B segment protocol address set and an address occurrence frequency of the C segment protocol address of the target network data packet in the C segment protocol address set. The server respectively determines a B segment confidence corresponding to the address occurrence frequency of the B segment protocol address, and a C segment confidence corresponding to the address occurrence frequency of the C segment protocol address based on the preset rules, and uses a sum of the B segment confidence and the C segment confidence as the address frequency confidence.

In this embodiment of this application, in addition to determining the address frequency confidence in the foregoing manner, the server may further determine the address frequency confidence in the following manner: The server adds the address occurrence frequency of the B segment protocol address and the address occurrence frequency of the C segment protocol address to obtain a target address occurrence frequency, and determines an address frequency confidence corresponding to the target address occurrence frequency based on a preset rule.

In this way, the server obtains the traffic payload confidence and the traffic attribute confidence. The server may add the traffic payload confidence and the traffic attribute confidence to obtain the target confidence. If the target confidence is greater than a preset first confidence threshold, it is determined that the type of the target network data packet is an abnormal type; and if the target confidence is not greater than the preset first confidence threshold, it is determined that the type of the target network data packet is a normal type.

S104: Block a network connection of the target network data packet when the type of the target network data packet is an abnormal type.

In this embodiment of this application, if the type of the target network data packet is a normal type, and the service server and the server are in a parallel relationship (that is, the target network data packet is obtained by the server through bypass diversion), the server may not process the target network data packet.

If the type of the target network data packet is a normal type, and the service server and the server are in a series relationship, the server may forward the target network data packet to the service server, which means that the server considers that the target network data packet does not have any security threat. The service server may respond to a service request of the target network data packet.

If the type of the target network data packet is an abnormal type, and the service server and the server are in a parallel relationship (that is, the target network data packet is obtained by the server through bypass diversion), the server sends a blocking message (that is, a RESET message) to the client and the service server respectively. The function of the RESET message is to block the network connection between the client and the service server (the network connection is also referred to as a TCP connection), so that the service server can release connection resources. The released connection resources may be used for responding to requests of other normal types of target network data packets to avoid service server downtime. In this case, the service server may receive the target network data packet. Once receiving the blocking message, the service server does not need to respond to the service request of the target network data packet. Alternatively, in this application, the time consumed for detecting the type of the target network data packet is short enough, and before the target network data packet reaches the service server, the server detects the type of the target network data packet. If the type is an abnormal type, the network connection between the client and the service server is directly blocked. That is, the network connection is blocked before the service server receives the target network data packet. Therefore, the service server does not receive the target network data packet.

If the type of the target network data packet is an abnormal type, and the service server and the server are in a series relationship, the server discards the target network data packet, and sends a blocking message to the client and the service server respectively, so that the service server releases connection resources. The released connection resources may be used for responding to requests of other normal types of target network data packets to avoid service server downtime. In this case, the service server definitely does not receive the target network data packet, nor responds to the service request of the target network data packet.

It may be understood that the IP resources under Internet Protocol Version 6 (IPv6) are endless, and normal IP and abnormal IP are public. Therefore, using the method of blocking IP for defense may fail or lead to mistaken blocking. The data packet processing method provided in this embodiment of this application translates the behavior of the target network data packet into a rule. Regardless of whether an IP has appeared or not, and whether the IP is good or bad, once the rule is triggered, the IP is directly blocked, thereby achieving precise prevention and control and real-time blocking.

In this embodiment of this application, the server performs two test solutions: offline test and online test. In the offline test solution, the server collects three types of second-dial service providers (proxy, and virtual private network (VPN) and dynamic virtual private server (VPS)), covering 7 typical second-dial manufacturers, including 9 types of client behavior, and a total of 69 test (Proof of Concept, POC) use cases. The effectiveness of the strategy is verified offline through packet capture library (pcap) packet replay, where the accuracy rate is 99.9% and the coverage rate is 96.5%. In the online test solution, the server cannot simulate a formal second-dial attack by replaying the pcap packet at the time level. Therefore, the server uses a second-dial service of a specific manufacturer to build a target machine on the external network, and uses a real second-dial attack to verify the type identification strategy in this embodiment of this application. Experimental results show that all 12 types of network (web) attacks can be covered, with an accuracy rate of 99.9% and a coverage rate of more than 95%.

Figure 5:
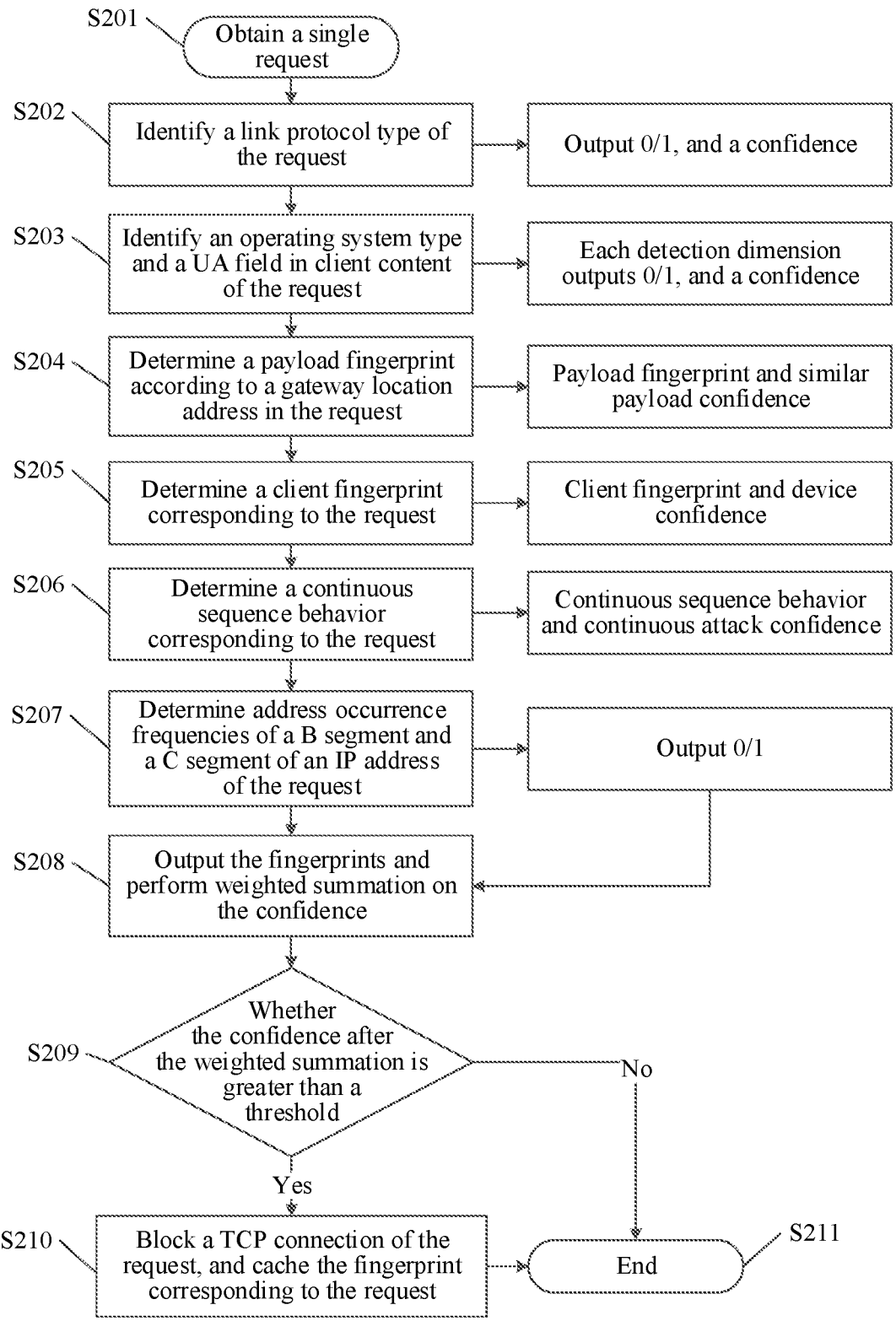
FIG. 5 is a schematic flowchart of data packet type detection according to an embodiment of this application.

FIG. 5 is a schematic flowchart of data packet type detection according to an embodiment of this application. As shown in FIG. 5, the data packet type detection includes S201 to S211, and the steps are respectively described below.

S201: Obtain a single request.

The single request may correspond to the target network data packet in this embodiment of this application.

S202: Identify a link protocol type of the request.

In this embodiment of this application, the server determines the protocol confidence (that is, the confidence corresponding to S202 in FIG. 5) corresponding to the identified link protocol type according to preset rules, and obtains a protocol confidence threshold. If the protocol confidence of the request is greater than the protocol confidence threshold, 1 is outputted; otherwise, 0 is outputted.

S203: Identify an operating system type and a UA field in client content of the request.

In this embodiment of this application, the server determines an operating system confidence corresponding to the identified operating system type according to preset rules, and determines a field attribute confidence (the operating system confidence and the field attribute confidence are confidences corresponding to S203 in FIG. 5) of the UA field. The corresponding confidence). The field attribute confidence of the identified UA field is identified depending on whether the UA is abnormal or not and an HTTP header sequence difference.

Similarly, if the operating system confidence is greater than the operating system confidence threshold, 1 is outputted; otherwise, 0 is outputted. If the field attribute confidence is greater than the attribute confidence threshold, 1 is outputted; otherwise 0 is outputted (that is, each monitoring maintenance in FIG. 5 output %).

S204: Determine a payload fingerprint according to a gateway location address in the request.

In this embodiment of this application, the payload fingerprint may correspond to the similar payload fingerprint in this embodiment of this application. The payload fingerprint is determined according to the gateway location address in the request and the similar payload key string library. An occurrence frequency of the payload fingerprint is searched in the similar payload fingerprint database. The similar payload confidence is determined according to the occurrence frequency. The payload fingerprint and the similar payload confidence are outputted.

S205: Determine a client fingerprint corresponding to the request.

In this embodiment of this application, the server calls the fingerprint identification function to determine the client fingerprint corresponding to the request, searches the device fingerprint database for an occurrence frequency of the client fingerprint, determines a device confidence according to the occurrence frequency, and outputs the client fingerprint and device confidence.

S206: Determine a continuous sequence behavior corresponding to the request.

In this embodiment of this application, the continuous sequence behavior may correspond to the continuous attack fingerprint in this embodiment of this application. The continuous sequence behavior of the request is determined according to the request and the continuous attack key string library. An occurrence frequency of the continuous sequence behavior is searched in the continuous fingerprint database. A continuous attack confidence is determined according to the occurrence frequency. The continuous sequence behavior and the continuous attack confidence are outputted.

S207: Determine address occurrence frequencies of a B segment and a C segment of an IP address of the request.

In this embodiment of this application, the server determines a B segment confidence according to the address occurrence frequency of the B segment, determines a C segment confidence according to the address occurrence frequency of the C segment, and adds the two confidences to obtain an address frequency confidence. If the address frequency confidence is greater than an address confidence threshold, 1 is outputted; otherwise 0 is outputted.

S208: Output the fingerprints and perform weighted summation on the confidences.

In this embodiment of this application, the outputted fingerprints or 0/1 are connected using "-", and the connected string is referred to as the fingerprint of the request. The weighted summation is performed on the outputted confidences.

S209: Determine whether the confidence after the weighted summation is greater than a threshold. If yes, S210 is performed; otherwise, S211 is performed.

S210: Block a TCP connection of the request, and cache the fingerprint corresponding to the request.

S211. End.

Figure 6:
FIG. 6 is a schematic flowchart 2 of a data packet processing method according to an embodiment of this application.

FIG. 6 is a schematic flowchart 2 of a data packet processing method according to an embodiment of this application. As shown in FIG. 6, the process of generating the traffic payload key string library and the fingerprint database is described. The data packet processing method includes S301 to S307, and the steps are described below.

S301: Obtain the plurality of historical network data packets, and extract a gateway location address from each of the historical network data packets.

In this embodiment of this application, the server obtains a plurality of historical network data packets, where a generation timestamp of each historical network data packet may be less than a generation timestamp of the target network data packet.

The server extracts a gateway location address of each historical network data packet, where the historical network data packet includes a request address URL, and the request address URL is formed by HOST+CGI. The CGI is the gateway location address of the historical network data packet in this embodiment of this application.

S302: Determine a plurality of first frequent sequence patterns from the plurality of gateway location addresses, and screen a similar payload high-frequency key string set from the plurality of first frequent sequence patterns.

In this embodiment of this application, the server performs word segmentation processing on each gateway location address to obtain a string set of each gateway location address. Based on a frequent modular sequence pattern extraction algorithm (the frequent modular sequence pattern algorithm may specifically be an association algorithm (prefixspan algorithm)), a frequent sequence pattern (referred to as a first frequent sequence pattern) is extracted from string sets of all gateway location addresses, where the first frequent sequence pattern is a string with a high occurrence frequency in the string sets of all the gateway location addresses. The processing process of the prefixspan algorithm is: starting from the prefix of length 1 to mine the sequence pattern, searching the corresponding projection database to obtain a frequent sequence corresponding to the prefix of length 1, recursively mining the frequent sequence corresponding to the prefix of length 2, and so on, until the frequent sequences corresponding to longer prefixes cannot be mined. After the server determines the first frequent sequence patterns, a term frequency-inverse document frequency (TF-IDF) algorithm is used to screen high-frequency first frequent sequence patterns in the first frequent sequence patterns, and the screened high-frequency first frequent sequence patterns are combined into a similar payload high-frequency key string set.

The strings in the similar payload high-frequency key string set are CGI template information of structures such as "param", "referer", "cookie", and "content" in the gateway location addresses.

The prefixspan algorithm combines the order of sequence item sets without generating candidate sequences, the suffix set shrinks quickly, the memory consumption is relatively small, and the effect is high when mining frequent sequence patterns. Therefore, this embodiment of this application adopts the prefixspan algorithm, which can quickly find the co-occurrence words (that is, the first frequent sequence patterns) in all CGIs, and quickly extract the templates of all CGIs.

S303: Determine a gateway location address template of each of the historical network data packets according to the similar payload high-frequency key string set.

In this embodiment of this application, for a string set of each gateway location address, the server respectively determines string sets belonging to both the string set of the gateway location address and the similar payload high-frequency key string set, and uses "-" to connect the determined strings to obtain a gateway location address template of each gateway location address.

S304: Call the fingerprint identification function to determine a client fingerprint of each of the historical network data packets.

In this embodiment of this application, the server calls the fingerprint identification function to determine a client fingerprint of each of the historical network data packets. The client fingerprint is used as a network fingerprint and used for identifying the underlying client and server applications, avoiding determination of underlying implementation according to an apparent identifying factor such as a "Client" or "Server" string.

The manner of determining the client fingerprint of the historical network data packet and the foregoing manner of determining the target client fingerprint of the target network data packet may be the same, except that the processing object is changed.

In this embodiment of this application, the server obtains a historical traffic attribute fingerprint and a historical traffic payload fingerprint of each historical network data packet, where the manner of determining the historical traffic attribute fingerprint is the same as that of determining the target traffic attribute fingerprint of the target network data packet in the foregoing, except that the processing object is changed. The historical traffic payload fingerprint includes a data fingerprint of the gateway address template of the historical network data packet, a client fingerprint of the historical network data packet, and a data fingerprint of an attack stage template of the historical network data packet, where the data fingerprint of the gateway location address template is an MD5 value of the gateway location address template, and the data fingerprint of the gateway location address template may also be referred to as a similar payload fingerprint of the historical network data packet. The specific process of determining the data fingerprint of the attack stage template of each historical network data packet is as follows: Word segmentation processing is performed on each historical network data packet to obtain a historical string set of each historical network data packet, and based on a frequent modular sequence pattern extraction algorithm, frequent sequence patterns (referred to as third frequent sequence patterns) are extracted from all historical string sets, where the third frequent sequence patterns are strings with a high occurrence frequency in all historical string sets. After the server determines the third frequent sequence patterns, the TF-IDF algorithm is used to screen the high-frequency third frequent sequence patterns, and the screened high-frequency third frequent sequence patterns are used as an attack stage high-frequency key string set. For the historical string set of each historical data packet, strings that belong to both the historical string set and the attack stage high-frequency key string set are respectively determined, and the determined strings are connected with "-", to obtain an attack stage template for each historical data packet.

The server determines a confidence (referred to as a first confidence) of the historical traffic attribute of each historical network data packet based on the preset rules. The first confidence may correspond to the traffic attribute confidence of the target network data packet. The server determines a second confidence according to an occurrence frequency of the data fingerprint of the gateway location address template of each historical network data packet in the data fingerprints of the gateway location address templates of all historical network data packets, and an occurrence frequency of the data fingerprint of the attack stage template of each historical network data packet in data fingerprints of attack stage templates of all historical network data packets, and an occurrence frequency of the client fingerprint of each historical network data packet in the client fingerprints of all historical network data packets. The manner of determining the second confidence is the same as the foregoing manner of determining the sum of the similar payload confidence, the continuous attack confidence, and the device confidence, except that the processing object is changed. In this way, the server obtains the first confidence and the second confidence of each historical network data packet. If a sum of first confidences and second confidences of all historical network data packets is greater than a preset second confidence threshold, the server performs the following S305; and if the sum of the first confidences and the second confidences of all historical network data packets is not greater than the preset second confidence threshold, the server may delete the plurality of historical network data packets.

The foregoing process may be understood as that: the server detects whether the plurality of historical network data packets are data packets corresponding to network attacks initiated by a second-dial IP, and if so, data fingerprints of the gateway location address templates corresponding to the historical network data packets, the client fingerprint, and the similar payload high-frequency key string set are stored in the corresponding database to update the database. In this embodiment of this application, the updated database may be used to determine the type of the target network data packet; and if not, the data related to the historical network data packets is discarded, indicating that the plurality of historical network data packets cannot be used to determine the type of the target network data packet.

S305: Store data fingerprints of the plurality of gateway location address templates and the plurality of client fingerprints in the fingerprint database, and store the similar payload high-frequency key string set to the similar payload key string library.

In this embodiment of this application, the server stores the data fingerprints of the gateway location address templates of all historical data packets in the similar payload fingerprint database, to update the similar payload fingerprint database. The updated similar payload fingerprint database may be used to determine the similar payload confidence of the target network data packet.

The server stores the client fingerprints of all historical network data packets in the device fingerprint database to update the device fingerprint database. The updated device fingerprint database may be used to determine the device confidence of the target network data packet.

The server stores the similar payload high-frequency key string set in the similar payload key string library. The similar payload key string library may be used to determine the similar payload key string of the target network data packet, and further determine the similar payload fingerprint of the target network data packet.

The data fingerprints of the attack stage templates of the historical network data packets are not stored in the continuous attack fingerprint database because although the plurality of historical network data packets are network attacks initiated by the second-dial IP, the plurality of historical network data packets are not necessarily data packets that belong to a plurality of continuous attack stages.

In this embodiment of this application, if the plurality of historical network data packets are network data packets belonging to a plurality of continuous attack stages, the server may divide the plurality of historical network data packets into a plurality of data packet sets. The number of the data packet sets is equal to the number of attack stages. Each data packet set belongs to an attack stage. The plurality of continuous attack stages include: a stage of collecting target information at spots, a stage of establishing a stronghold, and a stage of lateral movement. That is, the number of the data packet sets may be 3.

Word segmentation processing is performed on each historical network data packet to obtain a historical string set of each historical network data packet. For each data packet set, based on the frequent modular sequence pattern extraction algorithm (the frequent modular sequence pattern algorithm may specifically be the prefixspan algorithm), a frequent sequence pattern (referred to as a second frequent sequence pattern) is extracted from all the historical string sets included in each data packet set, where the second frequent sequence pattern is a string with a high occurrence frequency in all historical string sets included in each data packet set. After determining the second frequent sequence pattern of each data packet set, the server uses the TF-IDF algorithm to screen a high-frequency second frequent sequence pattern in the second frequent sequence pattern of each data packet set, and uses the screened high-frequency second frequent sequence pattern as a continuous attack high-frequency key string set for each data packet set. The continuous attack high-frequency key string set may be stored in the continuous attack key string library. The continuous attack key string library may be used to determine the continuous attack fingerprint of the target network data packet.

For the historical string set of each historical data packet, strings that belong to both the historical string set and the continuous attack high-frequency key string set are respectively determined, and the determined strings are connected with "-", to obtain a continuous attack template for each historical data packet. Taking a data packet set as a unit, data fingerprints (that is, MD5 values of the data fingerprints of the continuous attack templates) of continuous attack templates of historical data packets belonging to the same data packet set are combined as to-be-determined continuous attack template fingerprints. The to-be-determined continuous attack template fingerprints are stored in the continuous attack fingerprint database to update the continuous attack fingerprint database. The updated continuous attack fingerprint database may be used to determine the continuous attack confidence of the target network data packet.

If the plurality of historical network data packets are not network data packets in a plurality of continuous attack stages, the server further obtains a plurality of additional attack network data packets in a plurality of continuous attack stages, determines a data fingerprint of a continuous attack template of each attack network data packet based on the plurality of attack network data packets, and stores the fingerprint in the continuous attack fingerprint database.

The similar payload fingerprint database, the device fingerprint database, and the continuous attack fingerprint database may be updated at regular intervals, and network data packets obtained during this period may be used as historical network data packets to update the similar payload fingerprint database, the device fingerprint database, and the continuous attack fingerprint database.

That is, the target network data packet may be used in the next update of the similar payload fingerprint database, the device fingerprint database, and the continuous attack fingerprint database.

S306: Obtain a target network data packet, and generate data packet fingerprints of the target network data packet, the data packet fingerprints including a target traffic attribute fingerprint and a target traffic payload fingerprint.

S307: Determine a type of the target network data packet according to an occurrence frequency of the target traffic payload fingerprint in a fingerprint database and the target traffic attribute fingerprint, and block a network connection of the target network data packet when the type of the target network data packet is an abnormal type.

The fingerprint database includes historical traffic payload fingerprints of a plurality of historical network data packets.

For the processes of S306 and S307, reference may be made to S101 to S104 in the embodiments of this application corresponding to FIG. 3 above.

Figure 7:
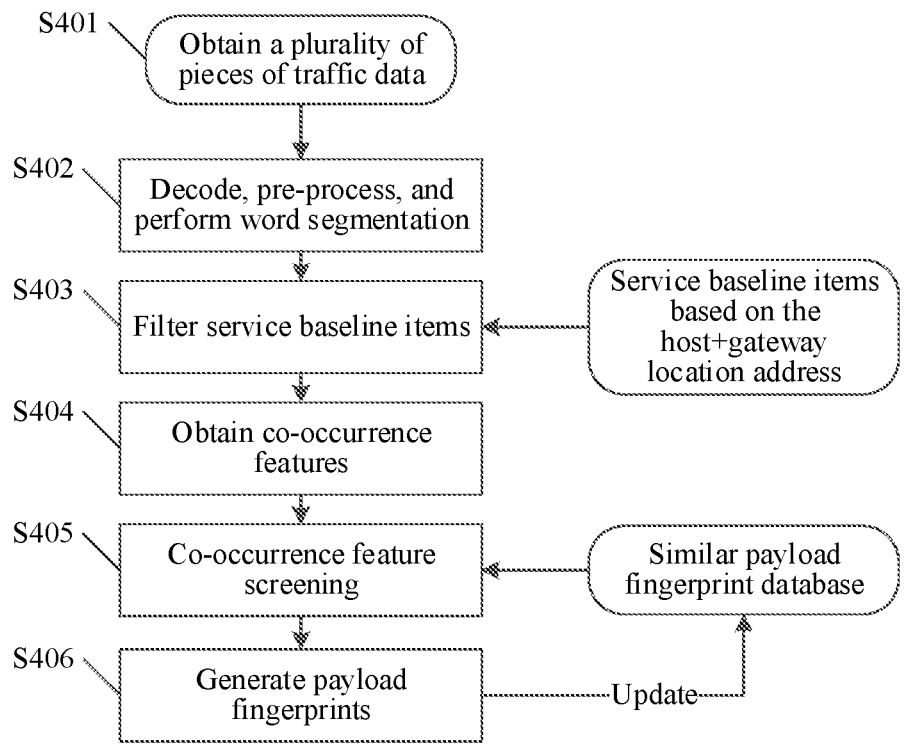
FIG. 7 is a schematic flowchart of determining a similar payload fingerprint database according to an embodiment of this application.

FIG. 7 is a schematic flowchart of determining a similar payload fingerprint database according to an embodiment of this application. As shown in FIG. 7, determining the similar payload fingerprint database includes S401 to S406, and the steps are described below.

S401: Obtain a plurality of pieces of traffic data.

The traffic data may correspond to the historical network data packets in the embodiments of this application, may be HTTP network data packets, may be TCP network data packets, may be user datagram protocol (UDP) network data packets, or the like.

S402: Decode, pre-process, and perform word segmentation.

The server extracts each traffic data gateway location address (CGI), and decodes, pre-processes, and performs word segmentation on the CGI, to obtain a string set of each CGI.

S403: Filter service baseline items.

In this embodiment of this application, the server filters the service baseline items, that is, filters the service baseline items based on the host+gateway location address. In other words, the server uses the prefixspan algorithm for all CGI string sets to extract frequent sequence patterns, that is, the CGI templates.

S404: Obtain co-occurrence features.

The server uses the extracted frequent sequence patterns as co-occurrence features.

S405: Co-occurrence feature screening.

The server uses the TF-IDF algorithm to extract high-frequency co-occurrence features in the co-occurrence features, to realize the co-occurrence feature screening.

S406: Generate payload fingerprints.

The server uses the high-frequency co-occurrence feature as a similar payload high-frequency key string set, and determines a payload fingerprint of each CGI according to the high-frequency co-occurrence features.

If it is detected that the plurality of pieces of traffic data are traffic data of the second-dial IP, the identified payload fingerprint of each CGI needs to be stored in the similar payload fingerprint database, and the similar payload high-frequency key string set needs to be stored in the similar payload key string library, to update the similar payload fingerprint database by using the payload fingerprints.

Figure 8:
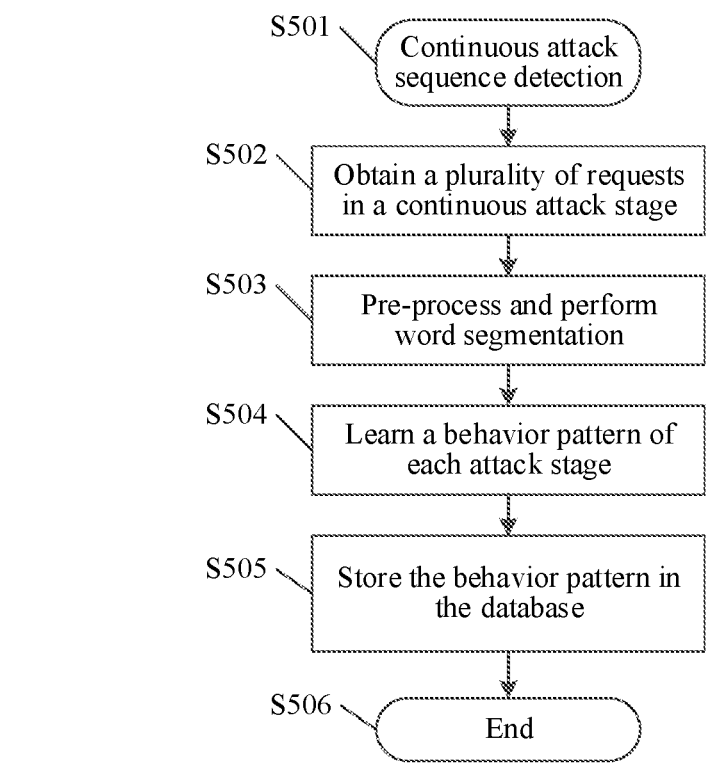
FIG. 8 is a schematic flowchart of determining a continuous attack fingerprint database according to an embodiment of this application.

FIG. 8 is a schematic flowchart of determining a continuous attack fingerprint database according to an embodiment of this application. As shown in FIG. 8, determining the continuous attack fingerprint database includes S501 to S506, and the steps are described below.

S501: Continuous attack sequence detection.

Based on the continuous attack sequence detection method, the server identifies whether a plurality of historical network data packets are network data packets belonging to a plurality of continuous attack stages.

S502: Obtain a plurality of requests in a continuous attack stage.

If the plurality of historical network data packets are network data packets belonging to a plurality of continuous attack stages, the server obtains the plurality of historical network data packets, and also obtains the plurality of requests in the continuous attack stage.

S503: Pre-process and perform word segmentation.

The server pre-processes and performs word segmentation on each historical network data packet, to obtain a string set of each network data packet.

S504: Learn a behavior pattern of each attack stage.

In this embodiment of this application, the server uses the prefixspan algorithm to extract frequent sequence patterns for all string sets of historical network data packets belonging to the same attack stage, and thus obtains a behavior pattern.

S505: Store the behavior pattern in the database.

In this embodiment of this application, the server stores the behavior pattern of each attack stage in the continuous attack key string library, determines a continuous attack fingerprint of each historical network data packet according to the behavior pattern of each attack stage, and stores the continuous attack fingerprint of each historical network data packet in the continuous attack fingerprint database, to complete the processing of storing the behavior pattern in the database.

S506. End.

The following describes the general process of detecting whether the target network data packet is a data packet of an abnormal type.

Figure 9:
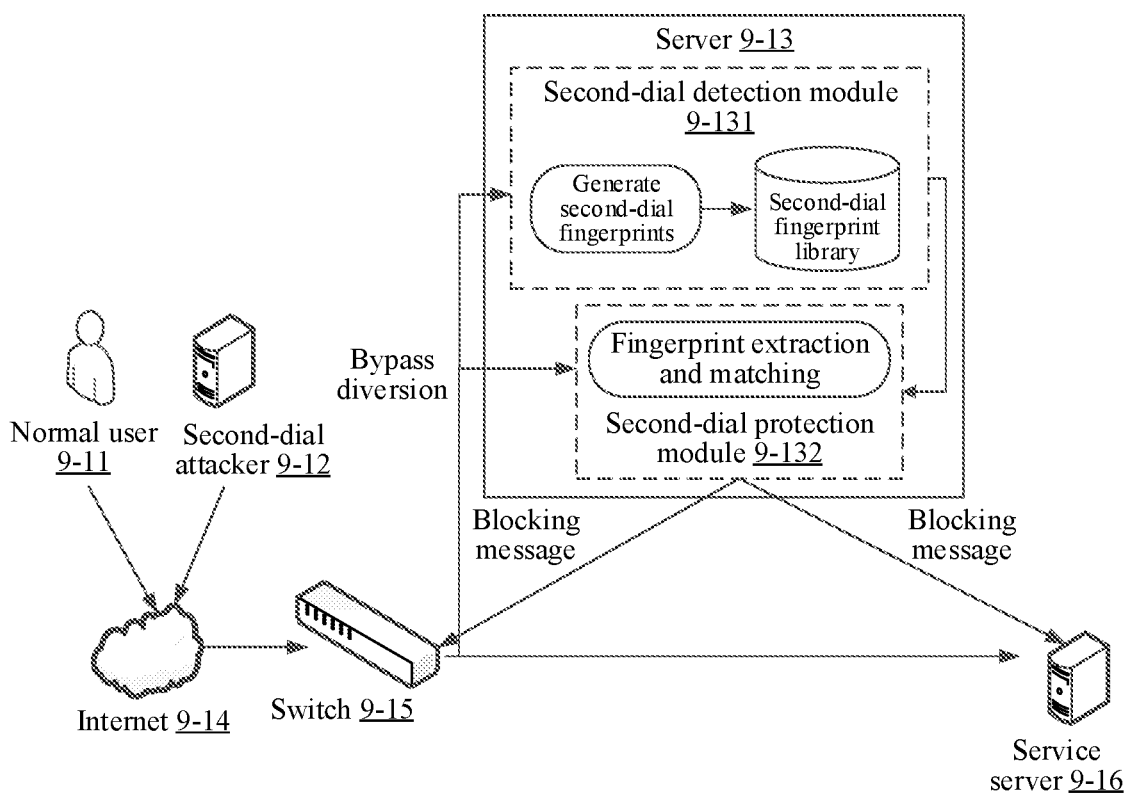
FIG. 9 and FIG. 10 are framework diagrams of data packet detection according to an embodiment of this application.
Figure 10:
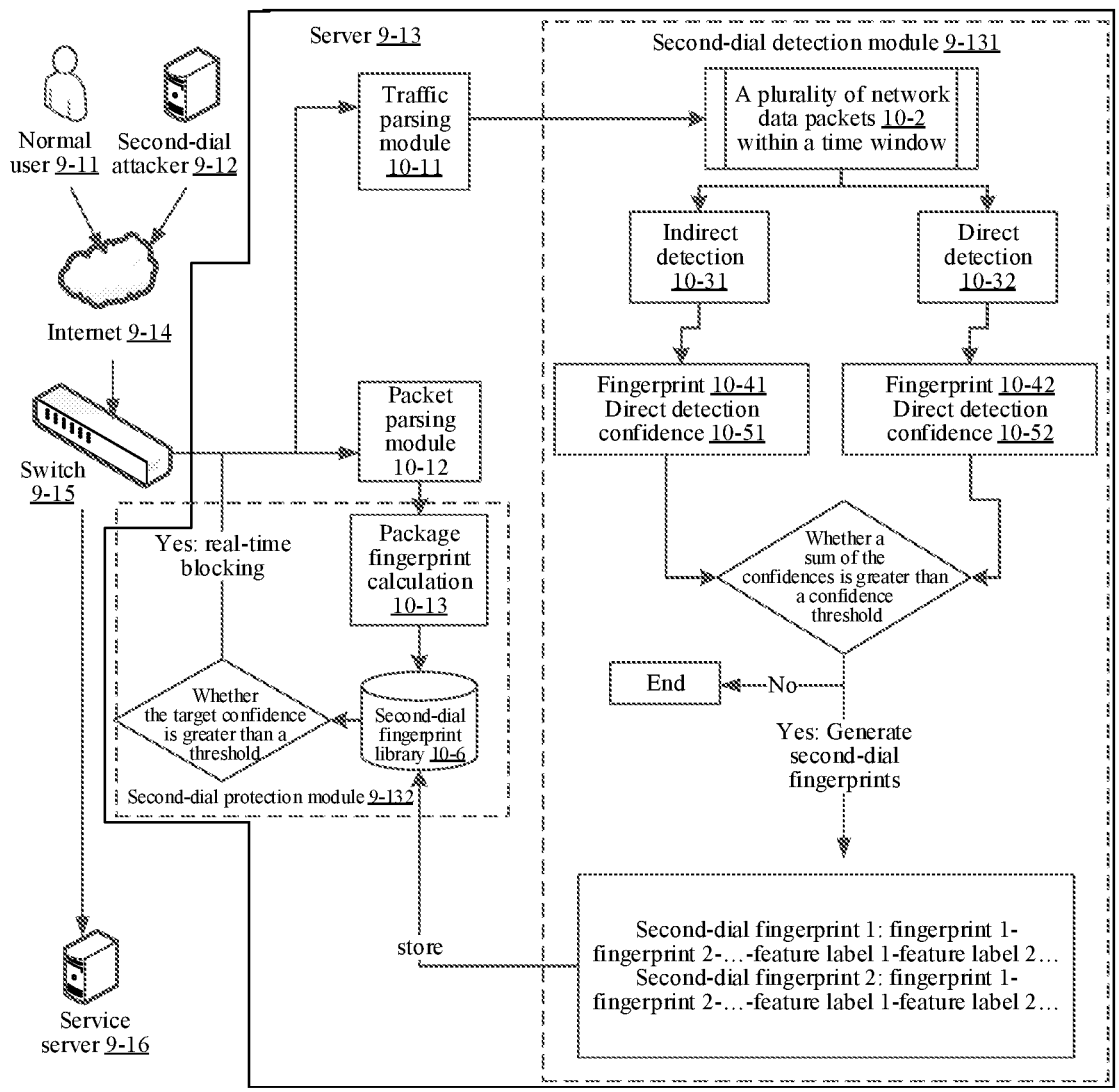

FIG. 9 and FIG. 10 are framework diagrams of data packet detection according to an embodiment of this application. The detection of data packets in this application may be used to resist network attacks initiated by the second-dial IP. Therefore, the data packet detection may be divided into two modules, which are a second-dial detection module and a second-dial protection module. The second-dial detection module is configured to generate second-dial fingerprints and establish a second-dial fingerprint library. The second-dial fingerprint may correspond to the traffic payload fingerprint in this embodiment of this application and a result value (the result value is equal to 0 or 1) corresponding to the traffic attribute fingerprint. The manner of determining the result value corresponding to the traffic attribute fingerprint is that: if a protocol confidence/client content confidence/address frequency confidence of a data packet is greater than a corresponding threshold, the corresponding result value is equal to 1; otherwise, the corresponding result value is equal to 0. The second-dial fingerprint library may correspond to the similar payload fingerprint database, the device fingerprint database, and the continuous attack fingerprint database in this embodiment of this application. As can be seen from FIG. 9, the traffic of a normal user 9-11 and a second-dial attacker 9-12 both enter a second-dial detection module 9-131 and a second-dial protection module 9-132 in a server 9-13 through the Internet 9-14 and a switch 9-15. The second-dial fingerprint library is updated by generating second-dial fingerprints, and fingerprints are extracted from the traffic. If a fingerprint matches the second-dial fingerprint library, the second-dial protection module 9-132 sends a bidirectional (the switch 9-15 and a service server 9-16) blocking message (RST packet) for blocking.

Based on FIG. 9, referring to FIG. 10, the right part of FIG. 10 (from a plurality of network data packets 10-2 in a time window to storage to a second-dial fingerprint library 10-6) belongs to the second-dial detection module 9-131, and the left part of FIG. 10 (from a packet fingerprint calculation module 10-13 to real-time blocking) belongs to the second-dial protection module 9-132.

First, the working process of the second-dial detection module 9-131 is described as follows: A traffic parsing module 10-11 in the server 9-13 obtains the plurality of network data packets 10-2 (a plurality of historical network data packets) within a time window, and performs indirect detection 10-31 and direct detection 10-32 on each network data packet. The direct detection 10-32 refers to determining a confidence corresponding to a link protocol type of the network data packet, a confidence corresponding to an operating system type, a confidence corresponding to a UA field, a confidence corresponding to the address occurrence frequency, and the like. If the confidence corresponding to the link protocol type, the confidence corresponding to the operating system type, the confidence corresponding to the UA field, and the confidence corresponding to the address occurrence frequency are greater than corresponding thresholds, corresponding output result values are 1; otherwise, the output result values are 0. A string formed by a plurality of 0 or 1 is a fingerprint (hash) 10-42 of the direct detection 10-32, and a sum of the plurality of result values is a direct detection confidence 10-52.

The indirect detection 10-31 refers to determining a confidence corresponding to similar payload fingerprint of a network data packet, a confidence corresponding to a continuous attack fingerprint, and a confidence corresponding to a client fingerprint. The similar payload fingerprint, the continuous attack fingerprint, and the client fingerprint of the network data packet are indirect detection fingerprints (hash) 10-41. A sum of the confidence corresponding to the similar payload fingerprint of the network data packet, the confidence corresponding to the continuous attack fingerprint, and the confidence corresponding to the client fingerprint is an indirect detection confidence 10-51. The confidence corresponding to the similar payload fingerprint is determined by an occurrence frequency in the similar payload fingerprints of all network data packets, the confidence corresponding to the continuous attack fingerprint is determined by an occurrence frequency in the continuous attack fingerprints of all network data packets, and the confidence corresponding to the client fingerprint is determined by an occurrence frequency in the client fingerprints of all network data packets.

Whether a sum of indirect detection confidences 10-51 and direct detection confidences 10-52 of all network data packets is greater than a confidence threshold is determined. If the sum of the confidences is greater than the confidence threshold, each network data packet generates a second-dial fingerprint, and stores the generated second-dial fingerprint (second-dial fingerprint 1: fingerprint 1-fingerprint 2- . . . -feature label 1-feature label 2 . . . ; second-dial fingerprint 2: fingerprint 1-fingerprint 2- . . . -feature label 1-feature label 2 . . . ) in the second-dial fingerprint library 10-6; otherwise, all the network data packets are discarded, and the process ends.

The working process of the second-dial protection module 9-132 is as follows: A to-be-detected network data packet (referred to as a target network data packet) is obtained. A packet parsing module 10-12 and the packet fingerprint calculation module 10-13 in the server 9-13 calculate a similar payload fingerprint, a continuous attack fingerprint, and a client fingerprint of the to-be-detected network data packet. According to occurrence frequencies of the similar payload fingerprint, the continuous attack fingerprint, and the client fingerprint in the second-dial fingerprint library 10-6, and a confidence corresponding to a link protocol type, a confidence corresponding to an operating system type, a confidence corresponding to a UA field, and a confidence corresponding to an address occurrence frequency of the to-be-detected network data packet, a target confidence of the to-be-detected network data packet is determined, and whether the target confidence is greater than a threshold is determined. If the target confidence is greater than the threshold, a TCP connection of the to-be-detected network data packet is blocked in real time.

In this embodiment of this application, whether the network data packets of a time period are data packets initiated by the second-dial IP is detected, and if so, a fingerprint database and an auxiliary key string library are constructed according to the network data packets of this time period, which can ensure the accuracy of the fingerprint database and the auxiliary key string library, thereby ensuring the accuracy of traffic payload fingerprints of subsequent to-be-detected data packets, and improving the accuracy of the data packet type detection. In this embodiment of this application, the behavior of the target network data packet is translated into rules, so that regardless of whether an IP has appeared or not, or whether the IP is good or bad, once the rules are triggered, blocking is directly performed, which can achieve precise prevention and control and real-time blocking.

Figure 11:
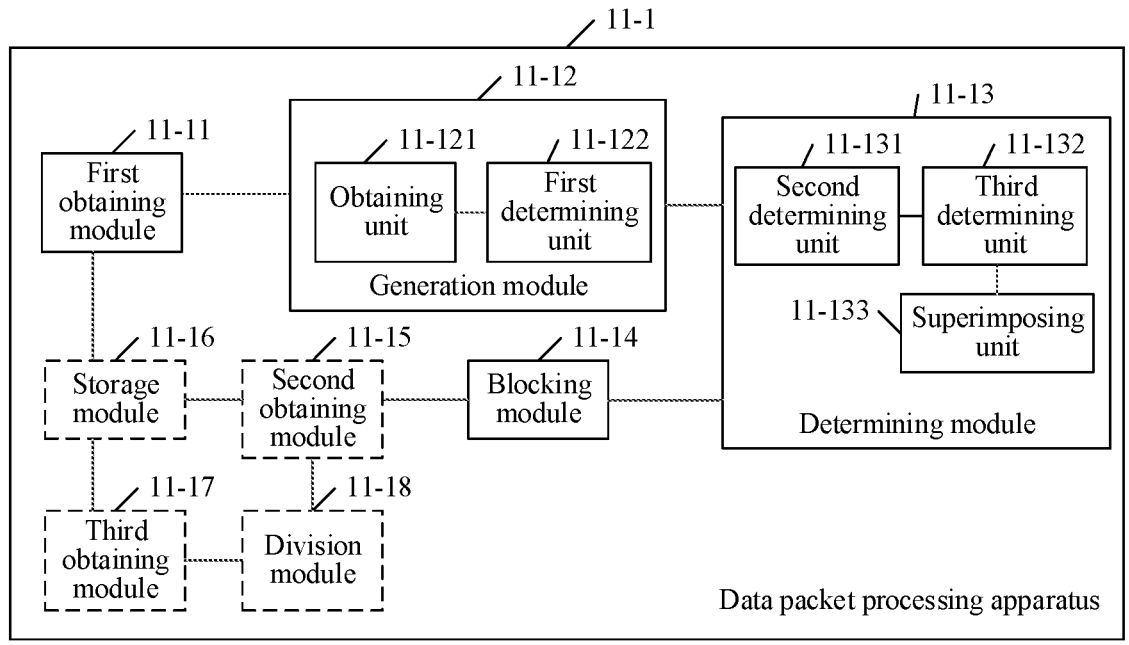
FIG. 11 is a schematic structural diagram of a data packet processing apparatus according to an embodiment of this application.

FIG. 11 is a schematic structural diagram of a data packet processing apparatus according to an embodiment of this application. As shown in FIG. 11, the data packet processing apparatus 11-1 may be the server in the foregoing embodiments corresponding to FIG. 3 to FIG. 10. In some embodiments of this application, the data packet processing apparatus 11-1 may be a computer program (including program code) running in a computer device. For example, the data packet processing apparatus 11-1 is application software. The data packet processing apparatus 11-1 may be configured to perform the corresponding steps in the data packet processing method provided in the embodiments of this application.

The data packet processing apparatus 11-1 may include: a first obtaining module 11-11, a generation module 11-12, a determining module 11-13, and a blocking module 11-14.

The first obtaining module 11-11 is configured to obtain a target network data packet. The generation module 11-12 is configured to generate data packet fingerprints of the target network data packet, the data packet fingerprints including a target traffic attribute fingerprint and a target traffic payload fingerprint. The determining module 11-13 is configured to determine a type of the target network data packet according to an occurrence frequency of the target traffic payload fingerprint in a fingerprint database and the target traffic attribute fingerprint, the fingerprint database including historical traffic payload fingerprints of a plurality of historical network data packets. The blocking module 11-14 is configured to block a network connection of the target network data packet when the type of the target network data packet is an abnormal type.

In this embodiment of this application, the target network data packet is obtained through bypass diversion; and the blocking module 11-14 is further configured to respectively transmit a blocking message to the client and a service server corresponding to the target network data packet, where the blocking message is used for blocking the network connection between the client and the service server.

For the functional implementation of the first obtaining module 11-11, the generation module 11-12, the determining module 11-13, and the blocking module 11-14, reference may be made to S101-S104 in the embodiments of this application corresponding to FIG. 3.

Referring to FIG. 11, the generation module 11-12 may include: an obtaining unit 11-121 and a first determining unit 11-122.

The obtaining unit 11-121 is configured to: obtain a link protocol type of the target network data packet, and extract client content related to a client of the target network data packet from the target network data packet; obtain address occurrence frequencies of a plurality of protocol segment addresses of the target network data packet in a protocol segment address set, and combine the link protocol type, the client content, and the address occurrence frequencies as the target traffic attribute fingerprint; and search a traffic payload key string library for payload key strings belonging to the target network data packet, and call a fingerprint identification function to determine a target client fingerprint of the target network data packet. The first determining unit 11-122 is configured to use data fingerprints of the payload key strings and the target client fingerprint as the target traffic payload fingerprint; and determine the target traffic attribute fingerprint and the target traffic payload fingerprint as the data packet fingerprints.

In this embodiment of this application, the payload key strings include a similar payload key string and a continuous attack key string; and the first determining unit 11-122 is further configured to: determine a data fingerprint of the similar payload key string and a data fingerprint of the continuous attack key string; and determine the data fingerprint of the similar payload key string and the data fingerprint of the continuous attack key string as the data fingerprints of the payload key strings.

For the specific functional implementation of the obtaining unit 11-121 and the first determining unit 11-122, reference may be made to S102 in the embodiments corresponding to FIG. 3.

Still referring to FIG. 11, the determining module 11-13 may include: a second determining unit 11-131, a third determining unit 11-132, and a superimposing unit 11-133.

In this embodiment of this application, the second determining unit 11-131 is configured to determine a traffic attribute confidence corresponding to the target traffic attribute fingerprint; the third determining unit 11-132 is configured to determine a traffic payload confidence according to the occurrence frequency of the target traffic payload fingerprint in the fingerprint database; the superimposing unit 11-133 is configured to superimpose the traffic attribute confidence and the traffic payload confidence into a target confidence; and the superimposing unit 11-133 is further configured to determine that the type of the target network data packet is the abnormal type when the target confidence is greater than a first confidence threshold.

In this embodiment of this application, the data fingerprints of the payload key strings include the data fingerprint of the similar payload key string and the data fingerprint of the continuous attack key string, and the fingerprint database includes a similar payload fingerprint database, a device fingerprint database, and a continuous attack fingerprint database; and the third determining unit 11-132 is further configured to: count a similar payload fingerprint occurrence frequency of the data fingerprint of the similar payload key string in the similar payload fingerprint database; count a device fingerprint occurrence frequency of the target client fingerprint in the device fingerprint database; count a continuous attack fingerprint occurrence frequency of the data fingerprint of the continuous attack key string in the continuous attack fingerprint database; and determine the similar payload fingerprint occurrence frequency, the device fingerprint occurrence frequency, and the continuous attack fingerprint occurrence frequency as the occurrence frequency of the target traffic payload fingerprint in the fingerprint database.

In this embodiment of this application, the third determining unit 11-132 is further configured to: determine a similar payload confidence according to the similar payload fingerprint occurrence frequency; determine a device confidence according to the device fingerprint occurrence frequency; determine a continuous attack confidence according to the continuous attack fingerprint occurrence frequency; and superimpose the similar payload confidence, the device confidence, and the continuous attack confidence into the traffic payload confidence.

In this embodiment of this application, the target traffic attribute fingerprint includes the link protocol type, the client content, and the address occurrence frequencies; and the second determining unit 11-131 is further configured to: determine a protocol confidence according to the link protocol type; determine a client content confidence according to the client content; determine an address frequency confidence according to the address occurrence frequency; and superimpose the protocol confidence, the client content confidence, and the address frequency confidence into the traffic attribute confidence.

For the functional implementation of the second determining unit 11-131, the third determining unit 11-132, and the superimposing unit 11-133, reference may be made to S103 in the embodiments of this application corresponding to FIG. 3.

Still referring to FIG. 11, the data packet processing apparatus 11-1 may include: a first obtaining module 11-11, a generation module 11-12, a determining module 11-13, and a blocking module 11-14; and may further include a second obtaining module 11-15 and a storage module 11-16.

The second obtaining module 11-15 is configured to: obtain the plurality of historical network data packets, and extract a gateway location address from each of the historical network data packets to obtain the plurality of gateway location addresses corresponding to the plurality of historical network data packets; determine a plurality of first frequent sequence patterns from the plurality of gateway location addresses, and screen a similar payload high-frequency key string set from the plurality of first frequent sequence patterns; determine a gateway location address template of each of the historical network data packets according to the similar payload high-frequency key string set; and call the fingerprint identification function to determine a client fingerprint of each of the historical network data packets, to obtain the plurality of client fingerprints corresponding to the plurality of historical network data packets. The storage module 11-16 is configured to: store data fingerprints of the plurality of gateway location address templates and the plurality of client fingerprints in the fingerprint database, where the data fingerprints of the plurality of gateway location address templates stored in the fingerprint database are used for determining a similar payload fingerprint occurrence frequency, and the plurality of client fingerprints stored in the fingerprint database are used for determining a device fingerprint occurrence frequency.

In this embodiment of this application, the fingerprint database includes a similar payload fingerprint database and a device fingerprint database; and the storage module 11-16 is further configured to: store the data fingerprints of the plurality of gateway location address templates in the similar payload fingerprint database; and store the plurality of client fingerprints in the device fingerprint database.

Still referring to FIG. 11, the data packet processing apparatus 11-1 may include: a first obtaining module 11-11, a generation module 11-12, a determining module 11-13, a blocking module 11-14, a second obtaining module 11-15, and a storage module 11-16; and may further include a third obtaining module 11-17.

The third obtaining module 11-17 is configured to: obtain a historical traffic attribute fingerprint and a historical traffic payload fingerprint of each of the historical network data packets; determine a first confidence of each of the historical traffic attribute fingerprints; determine a second confidence of each of the historical traffic payload fingerprints according to an occurrence frequency of each of the historical traffic payload fingerprints in all the historical traffic payload fingerprints; obtain a sum of the plurality of first confidences and the plurality of second confidences to obtain a total confidence; and store the data fingerprints of the plurality of gateway location address templates and the plurality of client fingerprints in the fingerprint database when the total confidence is greater than a second confidence threshold.

Still referring to FIG. 11, the fingerprint database further includes a continuous attack fingerprint database, and the plurality of historical network data packets are network data packets at a plurality of continuous attack stages. The data packet processing apparatus 11-1 may include: a first obtaining module 11-11, a generation module 11-12, a determining module 11-13, a blocking module 11-14, a second obtaining module 11-15, and a storage module 11-16; and may further include a division module 11-18.

In this embodiment of this application, the division module 11-18 is configured to: divide the plurality of historical network data packets into a plurality of data packet sets, where each of the data packet sets belongs to an attack stage; determine a plurality of second frequent sequence patterns of each of the data packet sets, and screening a continuous attack high-frequency key string set of each of the data packet sets from the plurality of second frequent sequence patterns; determine a continuous attack template of each historical network data packet in each of the data packet sets according to the continuous attack high-frequency key string set; and store a data fingerprint of the continuous attack template of each of the historical network data packets in the continuous attack fingerprint database, where the data fingerprint of the continuous attack template of each of the historical network data packets stored in the fingerprint database is used for determining a continuous attack fingerprint occurrence frequency.

For the specific functional implementation of the second obtaining module 11-15, the storage module 11-16, the third obtaining module 11-17, and the division module 11-18, reference may be made to S301-S305 in the embodiments of this application corresponding to FIG. 6.

Figure 12:
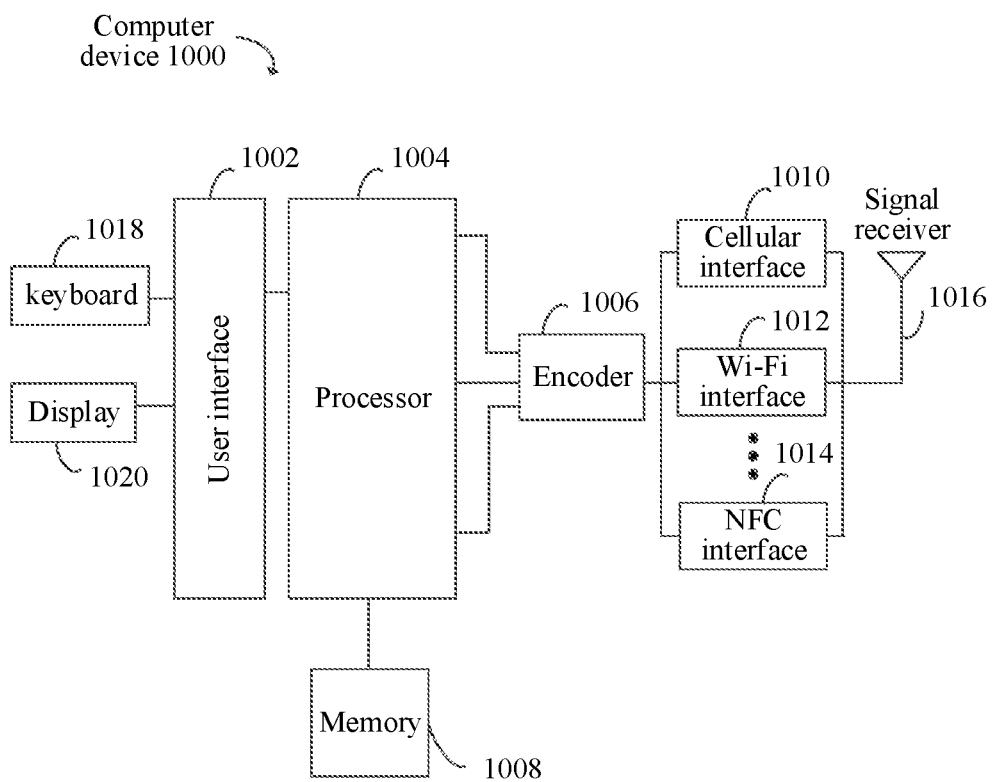
FIG. 12 is a schematic structural diagram of a computer device according to an embodiment of this application.

In this embodiment of this application, FIG. 12 is a schematic structural diagram of a computer device according to an embodiment of this application. The server in the embodiments of this application corresponding to FIG. 3 to FIG. 10 may be a computer device 1000 (an electronic device for data packet processing). As shown in FIG. 12, the computer device 1000 may include: a user interface 1002, a processor 1004, an encoder 1006, and a memory 1008. A signal receiver 1016 is configured to receive or transmit data by using a cellular interface 1010, a Wi-Fi interface 1012, . . . , or a near field communication (NFC) interface 1014. The encoder 1006 encodes the received data into a data format processed by a computer. The memory 1008 stores a computer program, and the processor 1004 is configured to perform steps in any one of the method embodiments through the computer program. The memory 1008 may include a volatile memory (for example, a dynamic random access memory (DRAM)), and may further include a non-volatile memory (for example, a one-time programmable read-only memory (OTPROM)). In some examples, the memory 1008 may further include memories remotely disposed relative to the processor 1004, and these remote memories may be connected to the computer device 1000 through a network. The user interface 1002 may include: a keyboard 1018 and a display 1020.

In the computer device 1000 shown in FIG. 12, the processor 1004 may be configured to call a computer program stored in the memory 1008 to implement the following steps: obtaining a target network data packet; generating data packet fingerprints of the target network data packet, the data packet fingerprints including a target traffic attribute fingerprint and a target traffic payload fingerprint; determining a type of the target network data packet according to an occurrence frequency of the target traffic payload fingerprint in a fingerprint database and the target traffic attribute fingerprint, the fingerprint database including historical traffic payload fingerprints of a plurality of historical network data packets; and blocking a network connection of the target network data packet when the type of the target network data packet is an abnormal type.

In an embodiment of this application, when generating data packet fingerprints of the target network data packet, the processor 1004 performs the following steps: obtaining a link protocol type of the target network data packet, and extracting client content related to a client of the target network data packet from the target network data packet; obtaining address occurrence frequencies of a plurality of protocol segment addresses of the target network data packet in a protocol segment address set, and combining the link protocol type, the client content, and the address occurrence frequencies as the target traffic attribute fingerprint; searching a traffic payload key string library for payload key strings belonging to the target network data packet, and calling a fingerprint identification function to determine a target client fingerprint of the target network data packet; using data fingerprints of the payload key strings and the target client fingerprint as the target traffic payload fingerprint; and determining the target traffic attribute fingerprint and the target traffic payload fingerprint as the data packet fingerprints.

In an embodiment of this application, the payload key strings include a similar payload key string and a continuous attack key string; and the processor 1004 further performs the following steps: determining a data fingerprint of the similar payload key string and a data fingerprint of the continuous attack key string; and determining the data fingerprint of the similar payload key string and the data fingerprint of the continuous attack key string as the data fingerprints of the payload key strings.

In an embodiment of this application, when determining a type of the target network data packet according to an occurrence frequency of the target traffic payload fingerprint in a fingerprint database and the target traffic attribute fingerprint, the processor 1004 further performs the following steps: determining a traffic attribute confidence corresponding to the target traffic attribute fingerprint; determining a traffic payload confidence according to the occurrence frequency of the target traffic payload fingerprint in the fingerprint database; superimposing the traffic attribute confidence and the traffic payload confidence into a target confidence; and determining that the type of the target network data packet is the abnormal type when the target confidence is greater than a first confidence threshold.

In an embodiment of this application, the data fingerprints of the payload key strings include the data fingerprint of the similar payload key string and the data fingerprint of the continuous attack key string, and the fingerprint database includes a similar payload fingerprint database, a device fingerprint database, and a continuous attack fingerprint database; and the processor 1004 performs the following steps: counting a similar payload fingerprint occurrence frequency of the data fingerprint of the similar payload key string in the similar payload fingerprint database; counting a device fingerprint occurrence frequency of the target client fingerprint in the device fingerprint database; counting a continuous attack fingerprint occurrence frequency of the data fingerprint of the continuous attack key string in the continuous attack fingerprint database; and determining the similar payload fingerprint occurrence frequency, the device fingerprint occurrence frequency, and the continuous attack fingerprint occurrence frequency as the occurrence frequency of the target traffic payload fingerprint in the fingerprint database.

In an embodiment of this application, when determining a traffic payload confidence according to the occurrence frequency of the target traffic payload fingerprint in the fingerprint database, the processor 1004 performs the following steps: determining a similar payload confidence according to the similar payload fingerprint occurrence frequency; determining a device confidence according to the device fingerprint occurrence frequency; determining a continuous attack confidence according to the continuous attack fingerprint occurrence frequency; and superimposing the similar payload confidence, the device confidence, and the continuous attack confidence into the traffic payload confidence.

In an embodiment of this application, The target traffic attribute fingerprint includes the link protocol type, the client content, and the address occurrence frequencies; and when determining a traffic attribute confidence corresponding to the target traffic attribute fingerprint, the processor 1004 performs the following steps: determining a protocol confidence according to the link protocol type; determining a client content confidence according to the client content; determining an address frequency confidence according to the address occurrence frequency; and superimposing the protocol confidence, the client content confidence, and the address frequency confidence into the traffic attribute confidence.

In an embodiment of this application, the target network data packet is obtained through bypass diversion; and when blocking a network connection of the target network data packet, the processor 1004 performs the following step: respectively transmitting a blocking message to the client and a service server corresponding to the target network data packet, where the blocking message is used for blocking the network connection between the client and the service server.

In an embodiment of this application, the processor 1004 further performs the following steps: obtaining the plurality of historical network data packets, and extracting a gateway location address from each of the historical network data packets to obtain the plurality of gateway location addresses corresponding to the plurality of historical network data packets; determining a plurality of first frequent sequence patterns from the plurality of gateway location addresses, and screening a similar payload high-frequency key string set from the plurality of first frequent sequence patterns; determining a gateway location address template of each of the historical network data packets according to the similar payload high-frequency key string set; calling the fingerprint identification function to determine a client fingerprint of each of the historical network data packets, to obtain the plurality of client fingerprints corresponding to the plurality of historical network data packets; and storing data fingerprints of the plurality of gateway location address templates and the plurality of client fingerprints in the fingerprint database, where the data fingerprints of the plurality of gateway location address templates stored in the fingerprint database are used for determining a similar payload fingerprint occurrence frequency, and the plurality of client fingerprints stored in the fingerprint database are used for determining a device fingerprint occurrence frequency.

In an embodiment of this application, the fingerprint database includes a similar payload fingerprint database and a device fingerprint database; and when storing data fingerprints of the plurality of gateway location address templates and the plurality of client fingerprints in the fingerprint database, the processor 1004 further performs the following steps: storing the data fingerprints of the plurality of gateway location address templates in the similar payload fingerprint database; and storing the plurality of client fingerprints in the device fingerprint database.

In an embodiment of this application, when storing data fingerprints of the plurality of gateway location address templates and the plurality of client fingerprints in the fingerprint database, the processor 1004 performs the following steps: obtaining a historical traffic attribute fingerprint and a historical traffic payload fingerprint of each of the historical network data packets; determining a first confidence of each of the historical traffic attribute fingerprints; determining a second confidence of each of the historical traffic payload fingerprints according to an occurrence frequency of each of the historical traffic payload fingerprints in all the historical traffic payload fingerprints; obtaining a sum of the plurality of first confidences and the plurality of second confidences to obtain a total confidence; and storing the data fingerprints of the plurality of gateway location address templates and the plurality of client fingerprints in the fingerprint database when the total confidence is greater than a second confidence threshold.

In an embodiment of this application, the fingerprint database further includes a continuous attack fingerprint database, and the plurality of historical network data packets are network data packets at a plurality of continuous attack stages; and the processor 1004 further performs the following steps: dividing the plurality of historical network data packets into a plurality of data packet sets, where each of the data packet sets belongs to an attack stage; determining a plurality of second frequent sequence patterns of each of the data packet sets, and screening a continuous attack high-frequency key string set of each of the data packet sets from the plurality of second frequent sequence patterns; determining a continuous attack template of each historical network data packet in each of the data packet sets according to the continuous attack high-frequency key string set; and storing a data fingerprint of the continuous attack template of each of the historical network data packets in the continuous attack fingerprint database, where the data fingerprint of the continuous attack template of each of the historical network data packets stored in the fingerprint database is used for determining a continuous attack fingerprint occurrence frequency.

The computer device 1000 described in this embodiment of this application can implement the descriptions of the data packet processing method in the foregoing embodiment of this application corresponding to FIG. 3 to FIG. 10, and can also implement the descriptions of the data packet processing apparatus 11-1 in the foregoing embodiment of this application corresponding to FIG. 11.

An embodiment of this application further provides a computer-readable storage medium. The computer-readable storage medium stores a computer program executed by the data packet processing apparatus 11-1 mentioned above, and the computer program includes program instructions. When executing the program instructions, the processor can perform the descriptions of the data packet processing method in the embodiments of this application corresponding to FIG. 3 to FIG. 10. For technical details that are not disclosed in the embodiments of this application corresponding to the computer-readable storage medium of the embodiments of this application, reference may be made to the descriptions of the data packet processing method provided in the embodiments of this application. In an example, the program instructions may be deployed to be executed on a computer device, or executed on a plurality of computer devices at the same location, or executed on a plurality of computer devices that are distributed at a plurality of locations and interconnected by using a communication network. The plurality of computer devices that are distributed at the plurality of locations and interconnected by using the communication network may form a blockchain network.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device can perform the data packet processing method in the embodiments of this application corresponding to FIG. 3 to FIG. 10.

A person of ordinary skill in the art may understand that, all or some of the processes of the data packet processing method in the embodiments of this application may be implemented by a computer program instructing relevant hardware. The program may be stored in a computer-readable storage medium. During execution of the program, the processes of the foregoing method embodiments may be included. The computer-readable storage medium may be a magnetic disk, an optical disc, a read-only memory (Read-Only Memory, ROM), a random access memory (Random Access Memory, RAM), or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data packet processing method performed by an electronic device, the method comprising:
   obtaining a target network data packet submitting by a client;
   generating data packet fingerprints of the target network data packet, the data packet fingerprints comprising a target client fingerprint, a target traffic attribute fingerprint and a target traffic payload fingerprint, further comprising:
      obtaining a link protocol type of the target network data packet and an operating system type and a user agent (UA) field of the client submitting the target network data packet;
      combining the link protocol type and the operating system type and the UA field of the client as the target traffic attribute fingerprint;
      searching a traffic payload key string library for a similar payload key string and a continuous attack key string belonging to the target network data packet;
      determining a data fingerprint of the similar payload key string and a data fingerprint of the continuous attack key string; and
      combining the data fingerprints of the similar payload key string and the continuous attack key string as the target traffic payload fingerprint;
   determining a type of the target network data packet according to an occurrence frequency of the target client fingerprint in a device fingerprint database, an occurrence frequency of the target traffic payload fingerprint in a fingerprint database and the target traffic attribute fingerprint, the fingerprint database comprising historical traffic payload fingerprints of a plurality of historical network data packets, further including:
      determining a device confidence according to the occurrence frequency of the target client fingerprint in the device fingerprint database;
      determining a traffic payload confidence according to the occurrence frequency of the target traffic payload fingerprint in the fingerprint database;
      determining a traffic attribute confidence corresponding to the link protocol type and the operating system type and the UA field of the client in the target traffic attribute fingerprint;
      summing the device confidence, the traffic payload confidence and the traffic attribute confidence into a target confidence; and
      determining that the type of the target network data packet is an abnormal type when the target confidence is greater than a first confidence threshold; and
   blocking a network connection of the target network data packet when the type of the target network data packet is the abnormal type by respectively transmitting a blocking message to the client of the target network data packet and a service server corresponding to the target network data packet, wherein the blocking message is used for (i) blocking a network connection between the client and the service server and (ii) causing the service server to release connection resources occupied by the client for responding to requests of other normal types of target network data packets.

2. The method according to claim 1, wherein the fingerprint database comprises a similar payload fingerprint database, and a continuous attack fingerprint database; and
the method further comprises:
counting a similar payload fingerprint occurrence frequency of the data fingerprint of the similar payload key string in the similar payload fingerprint database;
counting a continuous attack fingerprint occurrence frequency of the data fingerprint of the continuous attack key string in the continuous attack fingerprint database; and
determining the similar payload fingerprint occurrence frequency and the continuous attack fingerprint occurrence frequency as the occurrence frequency of the target traffic payload fingerprint in the fingerprint database.

3. The method according to claim 2, wherein the determining a traffic payload confidence according to the occurrence frequency of the target traffic payload fingerprint in the fingerprint database comprises:
determining a similar payload confidence according to the similar payload fingerprint occurrence frequency;
determining a device confidence according to the device fingerprint occurrence frequency;
determining a continuous attack confidence according to the continuous attack fingerprint occurrence frequency; and
superimposing the similar payload confidence, the device confidence, and the continuous attack confidence into the traffic payload confidence.

4. The method according to claim 1, further comprising:
obtaining the plurality of historical network data packets, and extracting a gateway location address from each of the historical network data packets to obtain a plurality of gateway location addresses corresponding to the plurality of historical network data packets;
determining a plurality of first frequent sequence patterns from the plurality of gateway location addresses, and screening a similar payload high-frequency key string set from the plurality of first frequent sequence patterns;
determining a gateway location address template of each of the historical network data packets according to the similar payload high-frequency key string set;
calling a fingerprint identification function to determine a client fingerprint of each of the historical network data packets, to obtain a plurality of client fingerprints corresponding to the plurality of historical network data packets; and
storing data fingerprints of a plurality of gateway location address templates and the plurality of client fingerprints in the fingerprint database, wherein the data fingerprints of the plurality of gateway location address templates stored in the fingerprint database are used for determining a similar payload fingerprint occurrence frequency, and the plurality of client fingerprints stored in the fingerprint database are used for determining a device fingerprint occurrence frequency.

5. The method according to claim 4, wherein the fingerprint database comprises a similar payload fingerprint database; and
the storing data fingerprints of a plurality of gateway location address templates and the plurality of client fingerprints in the fingerprint database comprises:
storing the data fingerprints of the plurality of gateway location address templates in the similar payload fingerprint database; and
storing the plurality of client fingerprints in the device fingerprint database.

6. The method according to claim 5, wherein the fingerprint database further comprises a continuous attack fingerprint database, and the plurality of historical network data packets are network data packets at a plurality of continuous attack stages; and
the method further comprises:
dividing the plurality of historical network data packets into a plurality of data packet sets, wherein each of the data packet sets belongs to an attack stage;
determining a plurality of second frequent sequence patterns of each of the data packet sets, and screening a continuous attack high-frequency key string set of each of the data packet sets from the plurality of second frequent sequence patterns;
determining a continuous attack template of each historical network data packet in each of the data packet sets according to the continuous attack high-frequency key string set; and
storing a data fingerprint of the continuous attack template of each of the historical network data packets in the continuous attack fingerprint database, wherein the data fingerprint of the continuous attack template of each of the historical network data packets stored in the fingerprint database is used for determining a continuous attack fingerprint occurrence frequency.

7. The method according to claim 4, wherein the storing data fingerprints of the plurality of gateway location address templates and the plurality of client fingerprints in the fingerprint database comprises:
obtaining a historical traffic attribute fingerprint and a historical traffic payload fingerprint of each of the historical network data packets;
determining a first confidence of each of the historical traffic attribute fingerprints;
determining a second confidence of each of the historical traffic payload fingerprints according to an occurrence frequency of each of the historical traffic payload fingerprints in all the historical traffic payload fingerprints;
obtaining a sum of a plurality of first confidences and a plurality of second confidences to obtain a total confidence; and
storing the data fingerprints of the plurality of gateway location address templates and the plurality of client fingerprints in the fingerprint database when the total confidence is greater than a second confidence threshold.

8. The method according to claim 1, wherein
the determining a traffic attribute confidence corresponding to the link protocol type and the operating system type and the UA field of the client in the target traffic attribute fingerprint comprises:
determining a protocol confidence according to the link protocol type;

determining a client content confidence according to the operating system type and the UA field of the client ; and superimposing the protocol confidence, the client content confidence into the traffic attribute confidence.

9. An electronic device for data packet processing, comprising a memory and a processor, the memory storing a computer program, the computer program, when executed by the processor, causing the electronic device to perform a data packet processing method including:

obtaining a target network data packet submitting by a client;

generating data packet fingerprints of the target network data packet, the data packet fingerprints comprising a target client fingerprint, a target traffic attribute fingerprint and a target traffic payload fingerprint, further comprising:

obtaining a link protocol type of the target network data packet and an operating system type and a user agent (UA) field of the client submitting the target network data packet;

combining the link protocol type and the operating system type and the UA field of the client as the target traffic attribute fingerprint;

searching a traffic payload key string library for a similar payload key string and a continuous attack key string belonging to the target network data packet;

determining a data fingerprint of the similar payload key string and a data fingerprint of the continuous attack key string; and combining the data fingerprints of the similar payload key string and the continuous attack key string as the target traffic payload fingerprint;

determining a type of the target network data packet according to an occurrence frequency of the target client fingerprint in a device fingerprint database, an occurrence frequency of the target traffic payload fingerprint in a fingerprint database and the target traffic attribute fingerprint, the fingerprint database comprising historical traffic payload fingerprints of a plurality of historical network data packets, further including:

determining a device confidence according to the occurrence frequency of the target client fingerprint in the device fingerprint database;

determining a traffic payload confidence according to the occurrence frequency of the target traffic payload fingerprint in the fingerprint database;

determining a traffic attribute confidence corresponding to the link protocol type and the operating system type and the UA field of the client in the target traffic attribute fingerprint;

summing the device confidence, the traffic payload confidence and the traffic attribute confidence into a target confidence; and determining that the type of the target network data packet is an abnormal type when the target confidence is greater than a first confidence threshold; and blocking a network connection of the target network data packet when the type of the target network data packet is the abnormal type by respectively transmitting a blocking message to the client of the target network data packet and a service server corresponding to the target network data packet, wherein the blocking message is used for (i) blocking a network connection between the client and the service server and (ii) causing the service server to release connection resources occupied by the client for responding to requests of other normal types of target network data packets.

10. The electronic device according to claim 9, wherein the method further comprises:

obtaining the plurality of historical network data packets, and extracting a gateway location address from each of the historical network data packets to obtain a plurality of gateway location addresses corresponding to the plurality of historical network data packets;

determining a plurality of first frequent sequence patterns from the plurality of gateway location addresses, and screening a similar payload high-frequency key string set from the plurality of first frequent sequence patterns;

determining a gateway location address template of each of the historical network data packets according to the similar payload high-frequency key string set;

calling a fingerprint identification function to determine a client fingerprint of each of the historical network data packets, to obtain a plurality of client fingerprints corresponding to the plurality of historical network data packets; and storing data fingerprints of the plurality of gateway location address templates and the plurality of client fingerprints in the fingerprint database, wherein the data fingerprints of the plurality of gateway location address templates stored in the fingerprint database are used for determining a similar payload fingerprint occurrence frequency, and the plurality of client fingerprints stored in the fingerprint database are used for determining a device fingerprint occurrence frequency.

11. A non-transitory computer-readable storage medium, storing a computer program, the computer program, when executed by a processor of an electronic device, causing the electronic device to perform a data packet processing method including:

obtaining a target network data packet submitting by a client;

generating data packet fingerprints of the target network data packet, the data packet fingerprints comprising a target client fingerprint, a target traffic attribute fingerprint and a target traffic payload fingerprint, further comprising:

obtaining a link protocol type of the target network data packet and an operating system type and a user agent (UA) field of the client submitting the target network data packet;

combining the link protocol type and the operating system type and the UA field of the client as the target traffic attribute fingerprint;

searching a traffic payload key string library for a similar payload key string and a continuous attack key string belonging to the target network data packet;

determining a data fingerprint of the similar payload key string and a data fingerprint of the continuous attack key string; and combining the data fingerprints of the similar payload key string and the continuous attack key string as the target traffic payload fingerprint;

determining a type of the target network data packet according to an occurrence frequency of the target client fingerprint in a device fingerprint database, an occurrence frequency of the target traffic payload fingerprint in a fingerprint database and the target traffic attribute fingerprint, the fingerprint database comprising historical traffic payload fingerprints of a plurality of historical network data packets, further including:
- determining a device confidence according to the occurrence frequency of the target client fingerprint in the device fingerprint database;
- determining a traffic payload confidence according to the occurrence frequency of the target traffic payload fingerprint in the fingerprint database;
- determining a traffic attribute confidence corresponding to the link protocol type and the operating system type and the UA field of the client in the target traffic attribute fingerprint;
- summing the device confidence, the traffic payload confidence and the traffic attribute confidence into a target confidence; and
- determining that the type of the target network data packet is an abnormal type when the target confidence is greater than a first confidence threshold; and blocking a network connection of the target network data packet when the type of the target network data packet is the abnormal type by respectively transmitting a blocking message to the client of the target network data packet and a service server corresponding to the target network data packet, wherein the blocking message is used for (i) blocking a network connection between the client and the service server and (ii) causing the service server to release connection resources occupied by the client for responding to requests of other normal types of target network data packets.

12. The non-transitory computer-readable storage medium according to claim 11, wherein the method further comprises:
- obtaining the plurality of historical network data packets, and extracting a gateway location address from each of the historical network data packets to obtain a plurality of gateway location addresses corresponding to the plurality of historical network data packets;
- determining a plurality of first frequent sequence patterns from the plurality of gateway location addresses, and screening a similar payload high-frequency key string set from the plurality of first frequent sequence patterns;
- determining a gateway location address template of each of the historical network data packets according to the similar payload high-frequency key string set;
- calling a fingerprint identification function to determine a client fingerprint of each of the historical network data packets, to obtain a plurality of client fingerprints corresponding to the plurality of historical network data packets; and
- storing data fingerprints of the plurality of gateway location address templates and the plurality of client fingerprints in the fingerprint database, wherein the data fingerprints of the plurality of gateway location address templates stored in the fingerprint database are used for determining a similar payload fingerprint occurrence frequency, and the plurality of client fingerprints stored in the fingerprint database are used for determining a device fingerprint occurrence frequency.

\* \* \* \* \*